(12) United States Patent
Morita et al.

(10) Patent No.: US 11,045,059 B2
(45) Date of Patent: Jun. 29, 2021

(54) SELF-PROPELLED ROBOT

(71) Applicant: Miraikikai, Inc., Kurashiki (JP)

(72) Inventors: Kazuo Morita, Takamatsu (JP); Tohru Miyake, Takamatsu (JP)

(73) Assignee: Miraikikai, Inc., Kurashiki (JP)

( * ) Notice: Subject to any disclaimer, the term of this patent is extended or adjusted under 35 U.S.C. 154(b) by 331 days.

(21) Appl. No.: 16/089,686

(22) PCT Filed: Mar. 31, 2017

(86) PCT No.: PCT/JP2017/013722
§ 371 (c)(1),
(2) Date: Sep. 28, 2018

(87) PCT Pub. No.: WO2017/171045
PCT Pub. Date: Oct. 5, 2017

(65) Prior Publication Data
US 2019/0269290 A1 Sep. 5, 2019

(30) Foreign Application Priority Data

Mar. 31, 2016 (JP) .............................. JP2016-073450
Mar. 31, 2016 (JP) .............................. JP2016-073452

(51) Int. Cl.
*A47L 11/00* (2006.01)
*A47L 11/40* (2006.01)
(Continued)

(52) U.S. Cl.
CPC ............ *A47L 11/4011* (2013.01); *A47L 9/28* (2013.01); *A47L 11/4061* (2013.01); *B08B 1/04* (2013.01);
(Continued)

(58) Field of Classification Search
CPC ..... B25J 9/1664; G05D 1/0011; G06Q 50/12; G01C 21/00; G01C 21/206; Y10S 901/01
See application file for complete search history.

(56) References Cited

U.S. PATENT DOCUMENTS

2005/0251292 A1\* 11/2005 Casey ................. G05D 1/0242
700/245
2012/0085368 A1 4/2012 Landry et al.
(Continued)

FOREIGN PATENT DOCUMENTS

| JP | 2004-166968 A | 6/2004 |
| JP | 2014509211 A | 4/2014 |
| WO | 2015199198 A1 | 12/2015 |

*Primary Examiner* — Ian Jen
(74) *Attorney, Agent, or Firm* — Muncy, Geissler, Olds & Lowe, P.C.

(57) ABSTRACT

A self-propelled robot autonomously travels on a structure having a target plane and performs work on the plane of the structure. The robot includes a robot main body provided with a moving means for autonomous traveling, a control unit that controls movement of the robot main body, and a working unit that performs work on the target plane. The control unit includes an edge detection unit that detects an edge of the target plane, and the edge detection unit includes an outer detection unit located outward from the working unit in the traveling direction of the robot main body and an inner detection unit located closer to the robot main body than the outer detection unit in the traveling direction of the robot main body.

10 Claims, 13 Drawing Sheets

(51) Int. Cl.
  *A47L 9/28* (2006.01)
  *B08B 1/04* (2006.01)
  *B08B 3/02* (2006.01)
  *B08B 7/04* (2006.01)
  *G05D 1/02* (2020.01)
  *G01B 11/10* (2006.01)
  *G01B 11/02* (2006.01)

(52) U.S. Cl.
  CPC .................. *B08B 3/02* (2013.01); *B08B 7/04* (2013.01); *G01B 11/024* (2013.01); *G01B 11/10* (2013.01); *G05D 1/02* (2013.01); *G05D 1/024* (2013.01); *A47L 2201/04* (2013.01); *G05D 2201/0203* (2013.01)

(56) References Cited

U.S. PATENT DOCUMENTS

| | | |
|---|---|---|
| 2012/0169497 A1 | 7/2012 | Schnittman et al. |
| 2014/0109935 A1* | 4/2014 | Jang .................. A47L 9/281 134/18 |
| 2014/0229008 A1 | 8/2014 | Schnittman et al. |
| 2016/0113469 A1 | 4/2016 | Schnittman et al. |

* cited by examiner (A)

(B)

SELF-PROPELLED ROBOT

TECHNICAL FIELD

The present invention relates to a self-propelled robot. More specifically, the present invention relates to a self-propelled robot that autonomously travels on the surface of a solar cell array used for solar power generation, the surface of a collector mirror used for solar thermal power generation, and the like so as to perform cleaning and the like.

BACKGROUND ART

In recent years, the demand for power generation using renewable energy has increased, and attention has been drawn particularly to solar power generation and solar thermal power generation utilizing sunlight.

For example, solar power generation facilities range from facilities with a power generation capacity of about 3 kW to 4 kW installed in general homes to large-scale power generation facilities having a generation capacity of more than 1 MW for commercial use. In addition, in solar thermal power generation facilities, there are many large-scale facilities with a power generation capacity exceeding 1 MW, which are expected as alternative power generation facilities for thermal power generation and nuclear power generation.

On the other hand, power generation using sunlight such as solar power generation and solar thermal power generation generates electricity upon reception of solar radiation from the sun. Accordingly, if the light-receiving surface of the solar cell array (that is, the solar cell module) or the collector mirror becomes dirty, the light transmittance of the cover glass constituting the light-receiving surface of the solar cell module in solar power generation decreases, resulting in a reduction in the amount of electric power generated. In the solar thermal power generation, as the reflectance of the collector mirror decreases, the amount of electric power generated decreases. That is, in solar power generation and solar thermal power generation, when the light-receiving surface of the solar cell module or the collector mirror is dirty, power generation performance is greatly reduced.

For this reason, in order to remove contamination on the light-receiving surface of the solar cell array or the like, it is important to properly clean the solar cell array and the like.

It is also possible for persons to clean such facilities regularly as long as they are installed in general homes. On the other hand, in the case of large-scale solar power generation facilities, their surface areas become very large, and hence it is substantially difficult for persons to clean and remove contamination on the surfaces of the solar cell arrays. For example, in the case of a 1 MW solar power generation facility, it is assumed that the facility is composed of solar cell modules each having a power generation output of 100 watts. In this case, the solar power generation facility as a whole includes 10,000 solar cell modules. When the area of one solar cell module is 1 square meter, the area to be cleaned reaches 10,000 square meters. A solar power generation facility is provided with a plurality of solar cell arrays including a plurality of solar cell modules as one set. The area of this solar cell array varies from about 50 square meters to 1,000 square meters although it depends on various conditions of the site. Therefore, in a large-scale solar power generation facility, a self-propelled robot capable of running on the surface of each solar cell array or the like by automatic or remote operation becomes an effective cleaning means.

Recently, various self-propelled cleaning robots that automatically clean floors of buildings and the like have been developed (for example, Patent Document 1), and such self-propelled cleaning robot may be used as a robot for cleaning a solar cell array or the like.

PRIOR ART DOCUMENTS

Patent Document

Patent Document 1: JP-A-2004-166968

SUMMARY OF THE INVENTION

Problems to be Solved by the Invention

However, the self-propelled cleaning robot according to Patent Document 1 performs indoor cleaning like a floor of a building. The edges of the floor are partitioned by walls and the like. The self-propelled cleaning robot detects obstacles such as walls by contact with them and determines areas to be cleaned such as floors. However, because the surface or the like of a solar cell array or the like has no obstacle or the like at the boundary of its surface, the boundary cannot be determined. If any boundary cannot be determined, the self-propelled cleaning robot may drop from the surface or the like and be damaged.

In view of the above circumstances, it is an object of the present invention to provide a self-propelled robot capable of preventing damage caused by dropping of the self-propelled robot or the like and efficiently performing work on a plane.

Means for Solving the Problems

A self-propelled robot according to the first aspect of the present invention is a robot that autonomously travels on a structure having a plane and performs work on the plane of the structure, including a robot main body provided with a moving means for autonomous traveling, a control unit that controls movement of the robot main body, and a working unit that performs work on a plane, wherein the control unit includes an edge detection unit that detects an edge of the plane, and the edge detection unit includes an outer detection unit located outward from the moving means in a traveling direction of the robot main body and an inner detection unit located rearward relative to the outer detection unit in the traveling direction of the robot main body and outward from the moving means in the traveling direction of the robot main body.

In the self-propelled robot according to the second aspect of the present invention, the inner detection unit in the first aspect of the invention is disposed so as to be positioned between the working unit and the moving means in the traveling direction of the robot main body.

In the self-propelled robot according to the third aspect of the present invention, the inner detection unit in the second aspect of the invention is disposed near a working device of the working unit.

In the self-propelled robot according to the fourth aspect of the present invention, the edge detection unit in the first, second, or third aspects of the invention is provided at an end portion of the robot main body in a direction intersecting the traveling direction, is located inward from the end portion of the working device or at the same position as the end portion, and is located outward from the moving means.

The self-propelled robot according to the fifth aspect of the present invention, in the first, second, third, or fourth aspect of the invention, includes danger detection units disposed between the inner detection unit and the moving means in the traveling direction of the robot main body and between the inner detection unit and the moving means in the direction intersecting the traveling direction of the robot main body and configured to detect an edge of the plane, and a danger avoidance control unit that controls movement of the robot main body based on signals from the danger detection units.

The self-propelled robot according to the sixth aspect of the present invention, in any one of the first to fifth aspects of the invention, includes a contact type sensor that detects running-off on a lower surface of the robot main body, and the control unit and/or the danger avoidance control unit stops an operation of the driving unit when the contact type sensor detects a signal indicating contact with the plane.

In the self-propelled robot according to the seventh aspect of the present invention, the control unit in any one of the first to sixth aspects of the invention executes a deceleration control function of decelerating the traveling speed of the self-propelled robot when the outer detection unit detects an edge of the plane and a stop control function of stopping the self-propelled robot when the inner detection unit detects an edge of the plane after executing the deceleration control.

In the self-propelled robot according to the eighth aspect of the present invention, the outer detection unit, in the seventh aspect of the invention, includes a pair of edge sensors arranged side by side along the width direction intersecting the traveling direction of the self-propelled robot, the inner detection unit includes a pair of edge sensors arranged side by side along the width direction intersecting the traveling direction of the self-propelled robot, and the control unit executes deceleration control when both the pair of edge sensors of the outer detection unit detect an edge of the place and executes stop control when both of the pair of edge sensors of the inner detection unit detect the edge of the plane.

In the self-propelled robot according to the ninth aspect of the present invention, the control unit in the eighth aspect of the invention controls the moving means so as to move the self-propelled robot in a direction toward an end edge of the plane when the outer detection unit and the inner detection unit are located inward from the edge of the plane while the self-propelled robot is moving in a direction along the edge of the plane, and controls the moving means so as to move the self-propelled robot in a direction away from the edge of the plane when only an edge sensor, of a pair of edge sensors of the outer detection unit which is located on the edge side of the plane detects the edge of the plane.

Effect of the Invention

According to the first aspect of the present invention, because the outer detection unit and the inner detection unit are provided and their positions are shifted from each other in the moving direction of the robot main body, it is possible to prevent running off or dropping of the robot main body due to a detection error concerning the edge of the plane. In addition, appropriately setting the distance between the outer detection unit and the inner detection unit makes it possible to distinguish between the edge of the plane and the groove in which the robot main body can travel.

According to the second aspect of the present invention, because the working unit is disposed between the outer detection unit and the inner detection unit, the operation can be carried out until the inner detection unit detects the edge. Therefore, it is possible to perform work up to the edge of the structure. Moreover, because the inner detection unit is disposed closer to the working unit than the moving means, it is also possible to prevent wheels and the like of the moving means from running off.

According to the third aspect of the present invention, the movement of the robot can be stopped promptly upon completion of the work up to the edge. Therefore, unnecessary movement can be reduced as much as possible, so that it is possible to prevent a reduction in working efficiency.

According to the fourth aspect of the present invention, it is possible to perform the work up to the side edge of the structure, and also to prevent the wheels and the like of the moving means from running off.

According to the fifth aspect of the present invention, even when the outer detection unit or the inner detection unit cannot detect an end portion of the plane because of a failure, if the danger detection unit detects the end portion of the plane, it is possible to prevent running off or dropping of the robot main body. In addition, when a danger avoidance control unit is provided, even if the control unit fails, it is possible to prevent running off or dropping of the robot main body.

According to the sixth aspect of the present invention, when the occurrence of running off is detected, the operation of the driving unit is stopped, so that the robot main body can be prevented from dropping from the target plane.

According to the seventh aspect of the present invention, when the edge of the plane is detected by the outer detection unit, the traveling speed is decelerated by the deceleration control function of the control means, and thereafter, when the inner edge detection unit detects the edge of the plane, the robot is stopped by the stop control function of the control means. That is, because the robot stops after deceleration, the braking distance at the time of stopping can be shortened. Therefore, even if the self-propelled robot is moved at high speed, the robot can be stopped before reaching the edge. Moreover, because the braking distance at the time of stopping can be shortened, even if the distance from the edge detection unit to the moving means is short, the self-propelled robot can be stopped before the moving means reaches the edge. That is, even if the length of the self-propelled robot in the traveling direction is shortened, it is possible to prevent the self-propelled robot from dropping from the edge.

According to the eighth aspect of the present invention, because neither deceleration control nor stop control is performed upon detection of the edge in the direction intersecting the traveling direction, it is possible to make the robot stably travel in the traveling direction.

According to the ninth aspect of the present invention, it is possible to move the robot along the edge while performing deceleration control and stop control.

MODE FOR CARRYING OUT THE INVENTION

A self-propelled robot according to the present invention is a robot that performs work on a portion formed into a planar shape, and is characterized by being able to work efficiently while moving on the planar portion.

Note that "plane" in this specification is a concept including a surface having a certain curvature. For example, this concept includes a curved surface having curvature that does not affect the traveling of the self-propelled robot, such as a surface having a sufficiently large radius of curvature as compared with the distance between the contact points of the moving means of the self-propelled robot (for example, wheel base, tread, or the like).

The work carried out by the self-propelled robot according to the present invention is not particularly limited. For example, the work carried out by the self-propelled robot according to the present invention corresponds to cleaning of the plane on which the self-propelled robot travels, defect inspection of the plane, measurement of a surface shape and the thickness of a member, temperature measurement, measurement of surface roughness, measurement of light reflectance and glossiness of a surface, and measurement of other physical quantities. In addition, the work carried out by the self-propelled robot according to the present invention corresponds to collection and observation, separation of surface deposits and painting, painting and preliminary treatment, and coating work. Further, the work carried out by the self-propelled robot according to the present invention includes pasting of a film or the like, polishing, marking, communication or the like by information presentation, and the like.

(Target Plane SF of Structure SP)

Before a description of a self-propelled robot 1, a brief description will be given concerning a structure SP on which the self-propelled robot 1 according to the embodiment performs work such as cleaning and a plane (target plane SF) to be cleaned.

Figure 10:
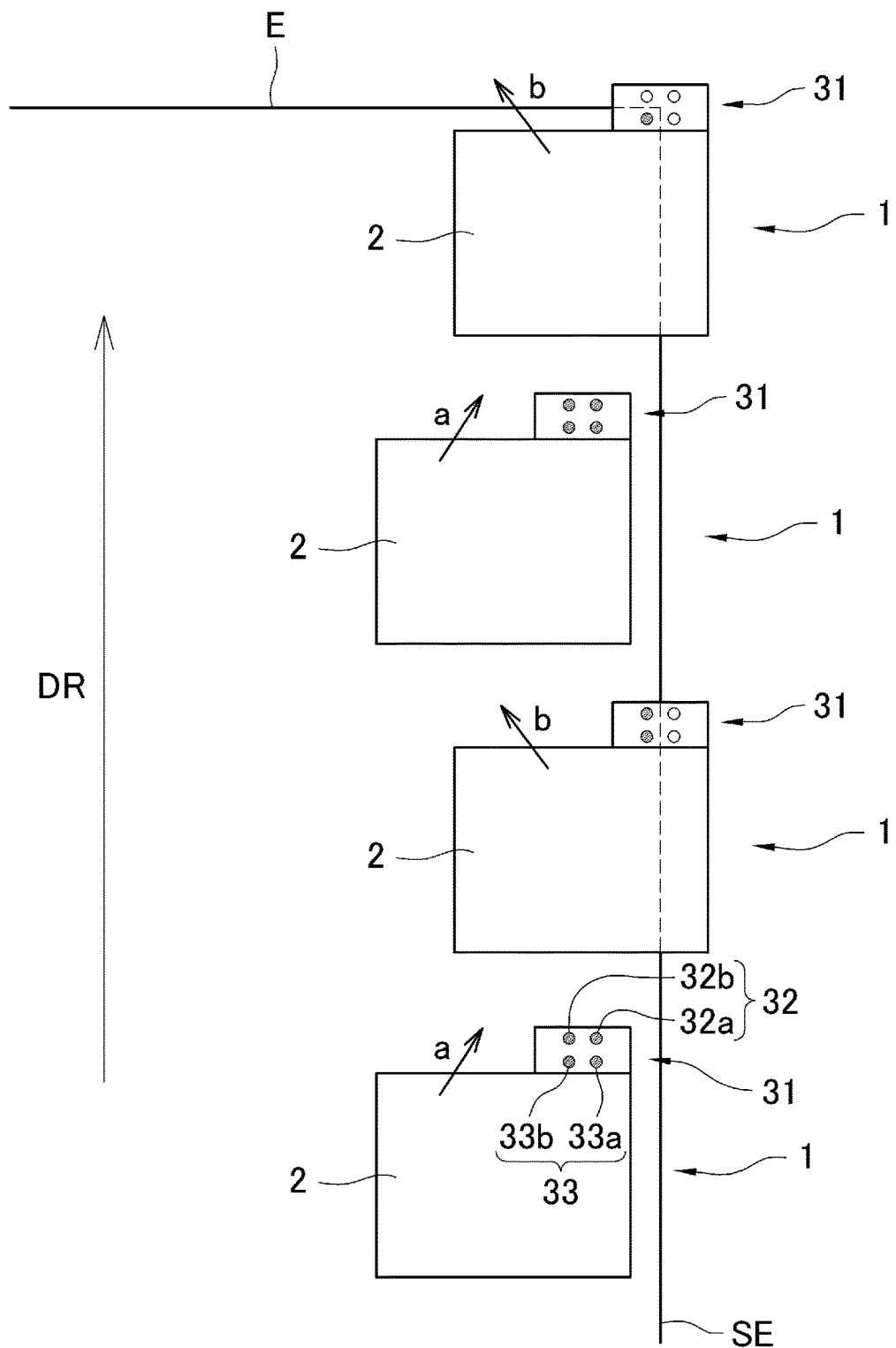
FIG. 10 is a schematic explanatory view of a situation in which the self-propelled robot 1 according to the embodiment moves along an edge E of a target plane SF.

As shown in FIG. 10, the structure SP where the self-propelled robot 1 according to the embodiment performs work such as cleaning includes, for example, a solar cell array of a large-scale solar power generation facility and, collector mirrors, solar water heaters, and the like in a solar thermal power generation facility. In these structures SP, the target plane SF has an inclination with respect to the horizon. In addition, the edge of the target plane SF is an edge whose angle between the surface and the side face is approximately 90°. In other words, the self-propelled robot 1 has a structure that may drop or run off the edge when traveling on the target plane SF. The self-propelled robot 1 according to the embodiment is an object to perform cleaning and the like of the target plane SF of the structure SP having such an edge.

Note that the structure SP and the target plane SF where the self-propelled robot 1 according to the embodiment performs work such as cleaning are not limited to a solar cell array of a solar power generation facility, and collector mirrors, solar water heaters, and the like in a solar thermal power generation facility. The self-propelled robot according to the embodiment as described above can perform work such as cleaning on any structure SP having the target plane SF on which the robot can autonomously travel. The structure SP and the like also correspond to, for example, a building installed outdoors which has a roof, a wall surface, and a window glass, a signboard, an electric bulletin board, the bodies of various vehicles such as a bus and a train, and the body of aircraft. Further, the structure SP corresponds to a building including various plate members such as a metal plate, a glass plate, a synthetic resin plate, and a wooden plate and an interior space in contact with a descending staircase, a piece of wood at front edge of entranceway floor, and the like.

The following will exemplify a case where the self-propelled robot cleans the surface of the structure SP (that is, each light-receiving surface to be referred to as the target plane SF hereinafter) such as a solar cell array, a collector mirror, a solar water heater, or the like in a solar thermal power generation facility.

When the working robot 1 carries out work other than cleaning, a working device, a sensor, an instrument, or the like is provided at a position where a pair of cleaning units 10, 10 (or one of the cleaning units 10) are provided. For example, when the work carried out by the self-propelled robot according to the present invention is defect inspection of a plane, measurement of a surface shape and the thickness of a member, temperature measurement, measurement of surface roughness, measurement of light reflectance and glossiness of a surface, and measurement of other physical quantities, various types of sensors to be used for the respective measurements are provided. When the work carried out by the self-propelled robot according to the present invention is a coating operation or a painting operation, an instrument such as a spray nozzle is provided. Further, a shot blasting, rotary type, or vibrating type polishing apparatus is provided when the work is separation treatment for deposits and coatings on a surface, a polishing treatment, or a preliminary surface treatment before coating. When the self-propelled robot according to the present invention sticks a film or the like, a roller or the like is provided. When the self-propelled robot according to the present invention performs communication by information presentation, a display, an LED, a loudspeaker, or the like is provided.

(Self-Propelled Robot 1)

The self-propelled robot 1 according to the embodiment will be described next.

The self-propelled robot 1 according to the embodiment autonomously travels on the target plane SF of the structure SP and performs work such as cleaning on the target plane SF of the structure SP.

Figure 3:
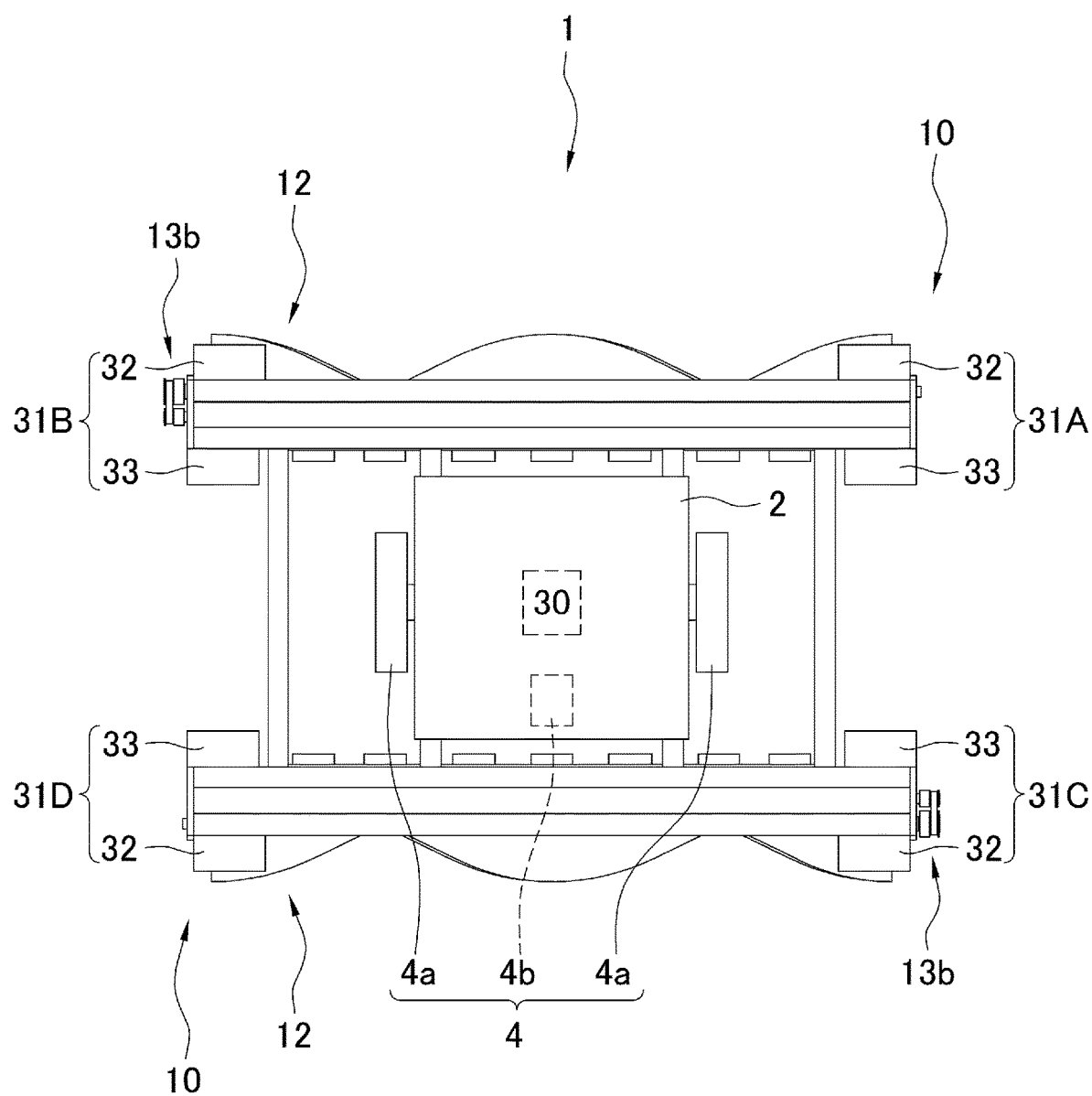
FIG. 3 is a schematic explanatory view of the self-propelled robot 1 according to the embodiment which performs a cleaning operation.
Figure 4:
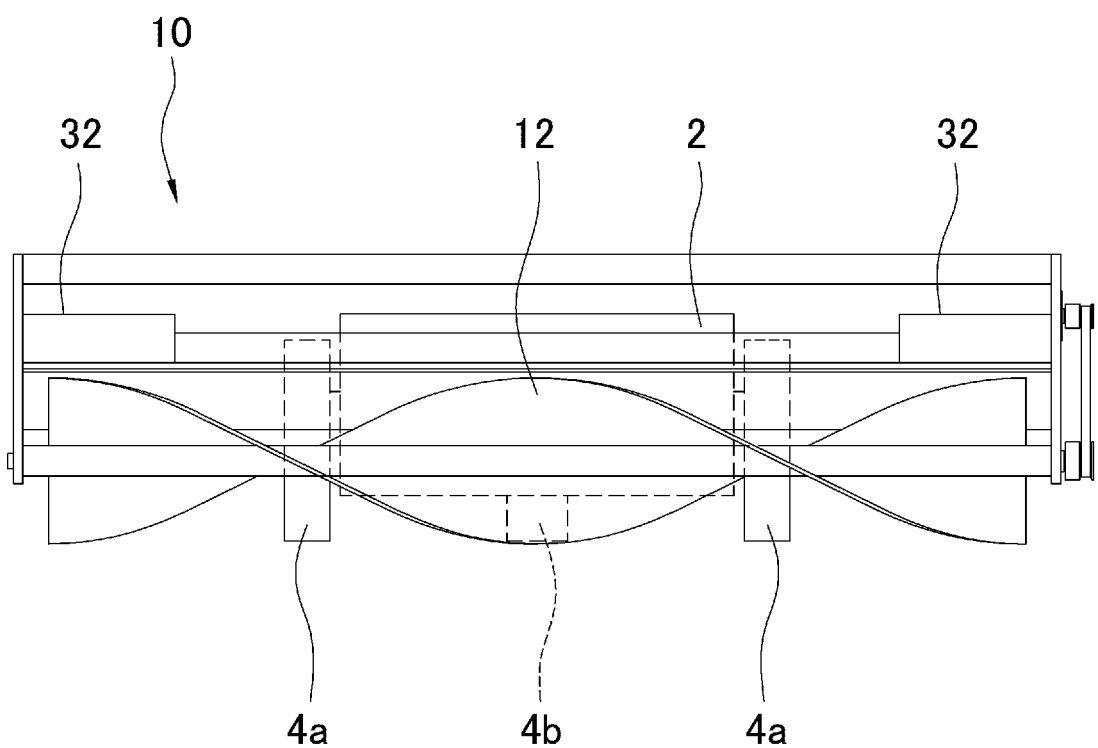
FIG. 4 is a schematic front view of the self-propelled robot 1 according to the embodiment which performs a cleaning operation.

As shown in FIGS. 3 and 4, the self-propelled robot 1 includes a robot main body 2 having a moving means 4 for traveling on the target plane SF (see FIG. 11) of the structure SP, a pair of cleaning units 10, 10 provided for the robot main body 2, and a control unit 30 for controlling operations of the moving means 4 and the pair of cleaning units 10, 10.
(Pair of Cleaning Units 10, 10)

As shown in FIGS. 3 and 4, the pair of cleaning units 10, 10 are respectively provided before and after the robot main body 2. The cleaning unit 10 includes a rotating brush 12, and can sweep the surface SF and clean it by rotating the brush 12.

It should be noted that the structure of the cleaning unit 10, that is, how the cleaning unit 10 sweeps the target plane SF of the structure SP is not particularly limited. For example, as the brush 12, it is possible to use not only a tool having a rotating shaft provided with a brush but also, for example, a tool having a plate-shaped blade erected on the surface of a rotating shaft, a tool having the surface of a rotating shaft entirely or partially covered with a sponge, and a tool having a cloth attached to the entire surface or a part of the surface of a rotating shaft. Instead of the brush 12, a sprinkler (spray nozzle or the like) and a wiper blade (squeegee) may be provided as the cleaning unit 10. Instead of the brush 12 or in addition to the brush 12, a vacuum cleaner (suction type vacuum cleaner) may be provided as the cleaning unit 10. Further, an air nozzle for ejecting a gas may be provided as the cleaning unit 10.

Although the case where the pair of cleaning units 10, 10 are provided before and after the robot main body 2 has been described, the cleaning unit 10 may be provided only before or after the robot main body 2.

The position at which the cleaning unit 10 is provided is not particularly limited, and may be provided at a position facing the lower surface of the robot main body 2 or the target plane SF.
(Moving Means 4)

As shown in FIGS. 3 and 4, the robot main body 2 is provided with moving means 4. The moving means 4 is provided so that the robot main body 2 can be moved in the forward and backward directions or can be rotated. For example, as shown in FIGS. 3 and 4, the moving means 4 may be constituted by a pair of side drive wheels 4a, 4a and one intermediate drive wheel 4b. In this case, when the pair of side drive wheels 4a, 4a and the intermediate drive wheel 4b are arranged to form a triangle in the plane view, the self-propelled robot 1 can be placed in a stable state on the target plane SF. In this case, it is preferable that drive motors are provided for all the drive wheels 4a and 4b of the moving means 4, and the respective drive motors can independently drive the drive wheels 4a and 4b. Then, by controlling the operation state of each drive motor by the control unit 30, it is possible to move the self-propelled robot 1 linearly or to turn it. In particular, by adopting an omni-wheel (omni-directional moving wheel) for the intermediate drive wheel 4b, it is possible to make the self-propelled robot 1 swing and move smoothly, and to increase the degree of freedom of movement of the self-propelled robot 1.

It is to be noted that the moving means 4 is not limited to the configuration described above, but may be configured to linearly move and swing the self-propelled robot 1. For example, instead of using the omni-wheel as the intermediate drive wheel 4b as a drive wheel, only the pair of drive wheels 4a, 4a may be drive wheels.

Instead of the omni-wheel, a passive wheel (caster) may be adopted for the intermediate drive wheel 4b. Even in this case, the moving direction of the self-propelled robot 1 can be freely changed by adjusting the rotational speeds of the pair of drive wheels 4a, 4a.

The robot may have the same structure as a vehicle such as a passenger vehicle. For example, as shown in FIGS. 6 to 8 and FIG. 13, four wheels 4c may be provided such that the two front (or rear) wheels are used as wheels for steering and the other wheels are drive wheels or a four-wheel drive system or four-steering wheel system is formed.

Further, the moving means 4 may be provided with crawlers instead of wheels. In this case, if a pair of crawlers are provided so as to sandwich the center (center of gravity) of the robot main body 2, controlling the operation of the drive motor for driving the pair of crawlers can linearly move or swing the self-propelled robot 1.
(Control Unit 30)

The control unit 30 has a function of controlling the movement of the self-propelled robot 1 by controlling the operation of the moving means 4. For example, as described above, when each drive wheel 4 is provided with a drive motor, the operation of the drive motor provided for each drive wheel 4 is controlled to control the moving direction and moving speed of the robot main body 2, that is, the moving direction and moving speed of the self-propelled robot 1. For example, when each of the drive motors 4m is operated so that the moving speeds of all the drive wheels 4 (specifically, numbers of revolutions (rotational speeds)× circumferential lengths of drive wheels) are the same, the self-propelled robot 1 can be moved straight. On the other hand, when each drive motor 4m is operated so that a difference in moving speed between the pair of side drive wheels 4a, 4a occurs, it is possible to move the self-propelled robot 1 so as to swing.

Figure 11:
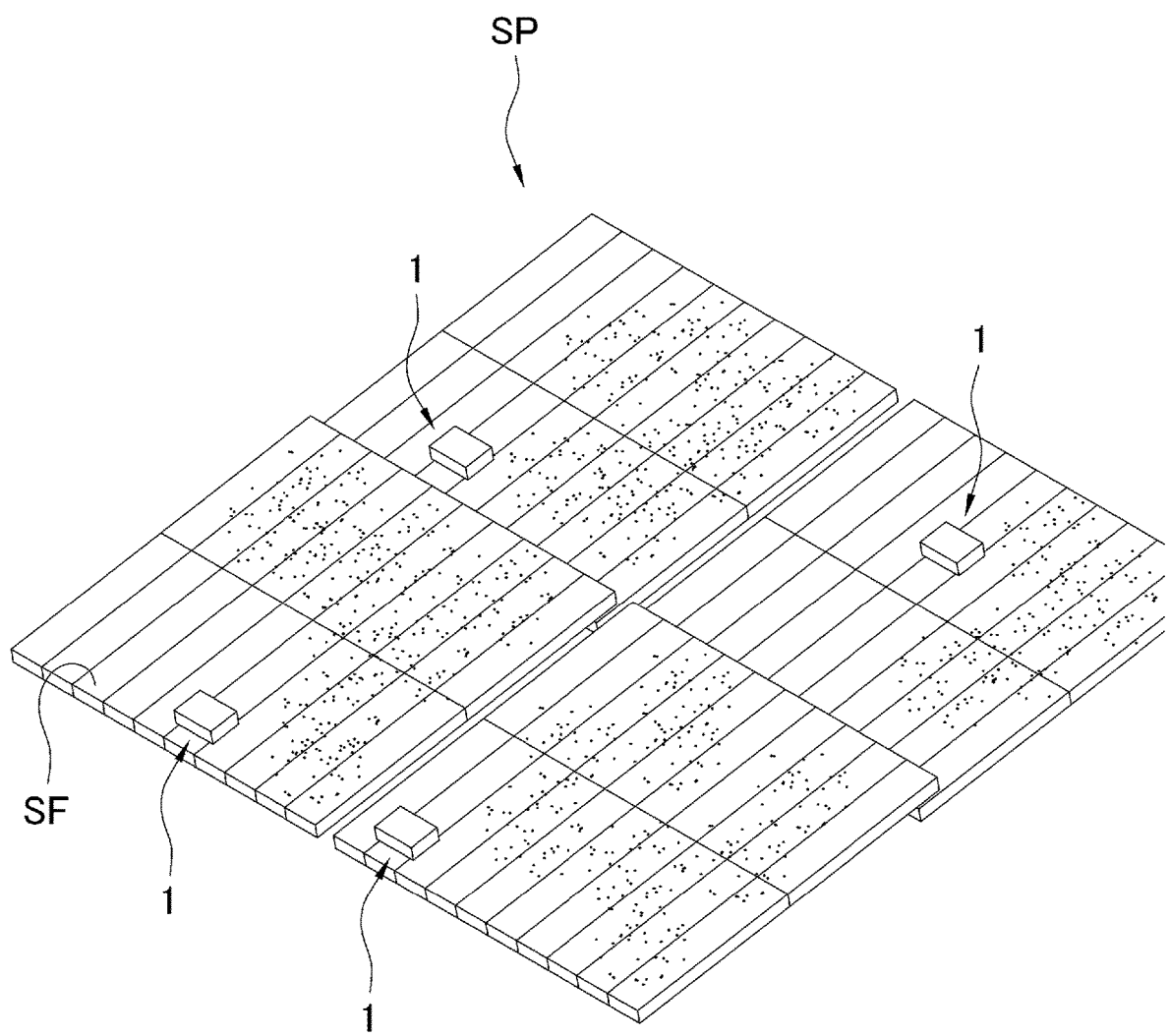
FIG. 11 is a schematic explanatory view of a structure SP on which the self-propelled robot 1 according to the embodiment performs work such as cleaning.

Because the self-propelled robot 1 according to the embodiment has the above-described configuration, when the self-propelled robot 1 is placed on the target plane SF of the structure SP, the self-propelled robot 1 can clean the target plane SF of the structure SP (see FIG. 11). In other words, because the moving means 4 can move the self-propelled robot 1 over the target plane SF, the target plane SF can be cleaned by the pair of cleaning units 10, 10.

Figure 12:
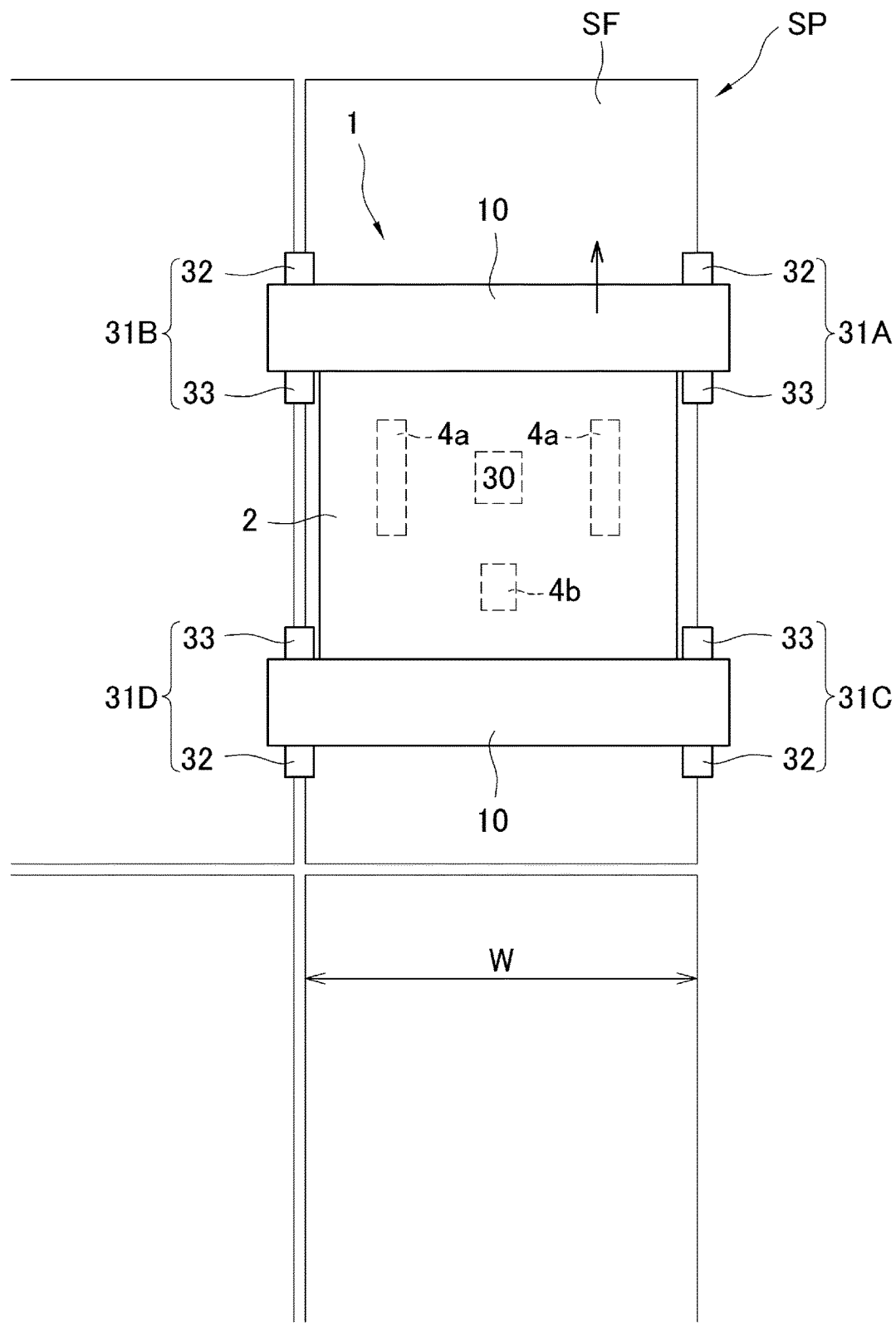
FIG. 12 is a schematic explanatory view of a situation in which the self-propelled robot 1 according to the embodiment is traveling on a target plane SF of the structure SP.

For example, when the structure SP is formed by a plurality of modules such as a solar cell array, the target plane SF of the structure SP is formed by the surfaces of a plurality of modules. In this case, as shown in FIG. 12, the width (the horizontal direction in FIG. 12) of the pair of cleaning units 10, 10 in the self-propelled robot 1 according to the embodiment is set to be longer than the width W of each module of the target plane SF in advance. Then, the self-propelled robot 1 according to the embodiment is placed on the target plane SF such that the width direction of the pair of cleaning units 10, 10 becomes parallel to the width direction (horizontal direction in FIG. 12) of each module of the target plane SF. In this state, when the self-propelled robot 1 according to the embodiment is made to travel along the longitudinal direction of each module, the entire surface of each module can be cleaned merely by making the self-propelled robot 1 according to the embodiment travel once.

Figure 13:
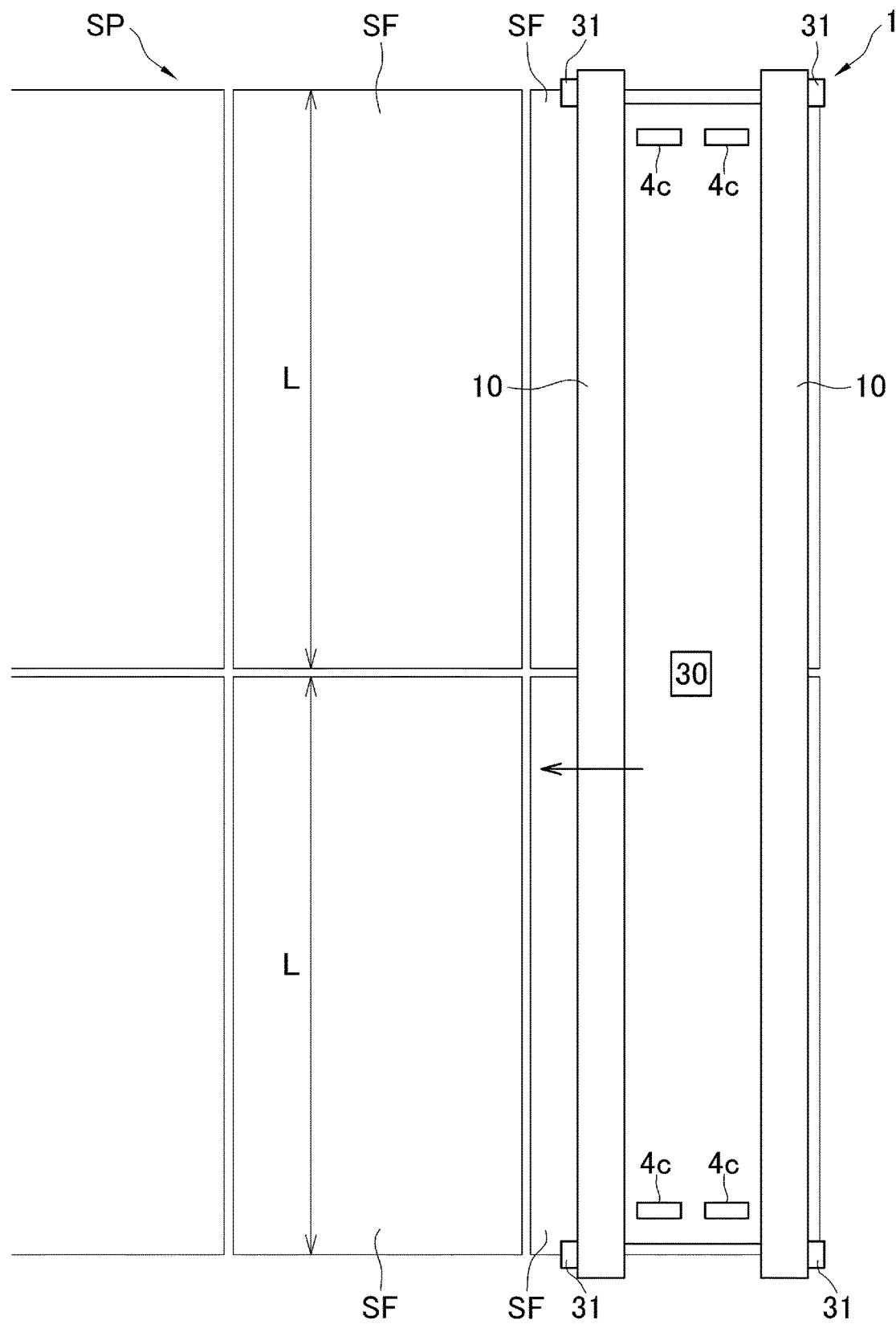
FIG. 13 is a schematic explanatory view of a situation in which the self-propelled robot 1 according to the embodiment is traveling on the target plane SF of the structure SP.

As shown in FIG. 13, the width (the vertical direction in FIG. 13) of the pair of cleaning units 10, 10 in the self-propelled robot 1 according to the embodiment is set to be slightly longer than the length of the target plane SF in the vertical direction in advance. For example, in the case of FIG. 13, target planes SF are formed such that the modules are arranged in upper and lower two stages. In this case, the width of the pair of cleaning units 10, 10 is set to be twice longer than a length L of each module of the target plane SF in advance. Then, the self-propelled robot 1 according to the embodiment is placed on the target plane SF such that the width direction of the pair of cleaning units 10, 10 becomes parallel to the longitudinal direction (vertical direction in FIG. 13) of each module of the target plane SF. In this state, when the self-propelled robot 1 according to the embodiment is made to travel along the longitudinal direction (the horizontal direction in FIG. 13) of the target plane SF, the entire surface of the target plane SF can be cleaned merely by making the self-propelled robot 1 according to the embodiment travel once.

(Edge Detection)

As shown in FIGS. 1 to 4, the self-propelled robot 1 includes a plurality of edge detection units 31 that detect an edge of the target plane SF. Based on the signals detected by the plurality of edge detection units 31, the control unit 30 controls the operation of the moving means 4 to prevent the self-propelled robot 1 from dropping from the target plane SF.

Figure 1:
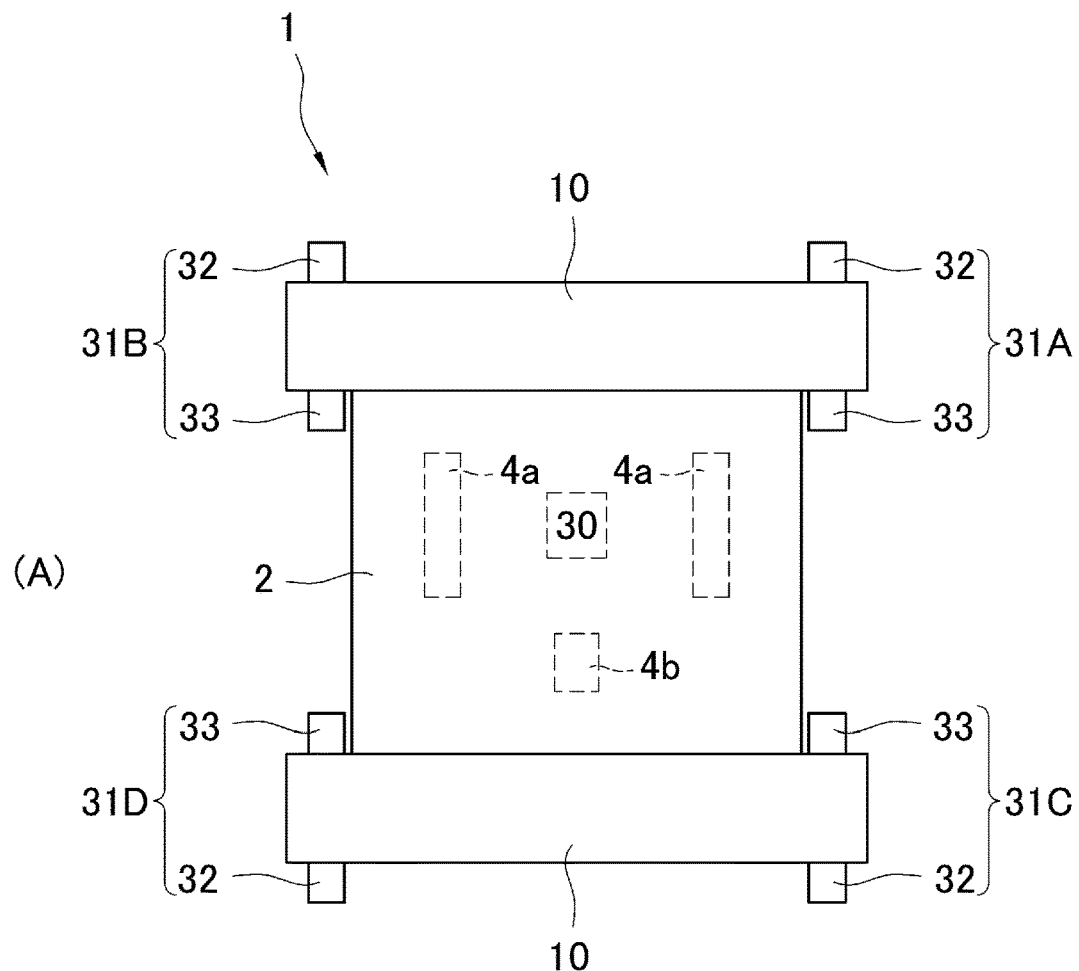
FIG. 1 is a schematic plan view of a self-propelled robot 1 according to an embodiment.
Figure 1:
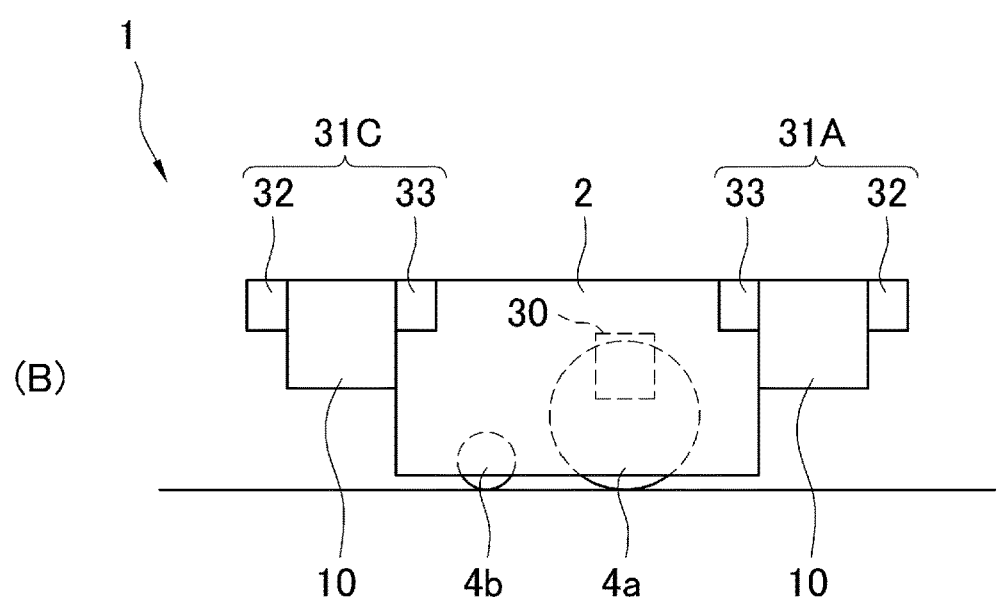

In order to make the configuration easy to understand, the following description will be made with reference to FIG. 1 showing a simplified structure.

Figure 2:
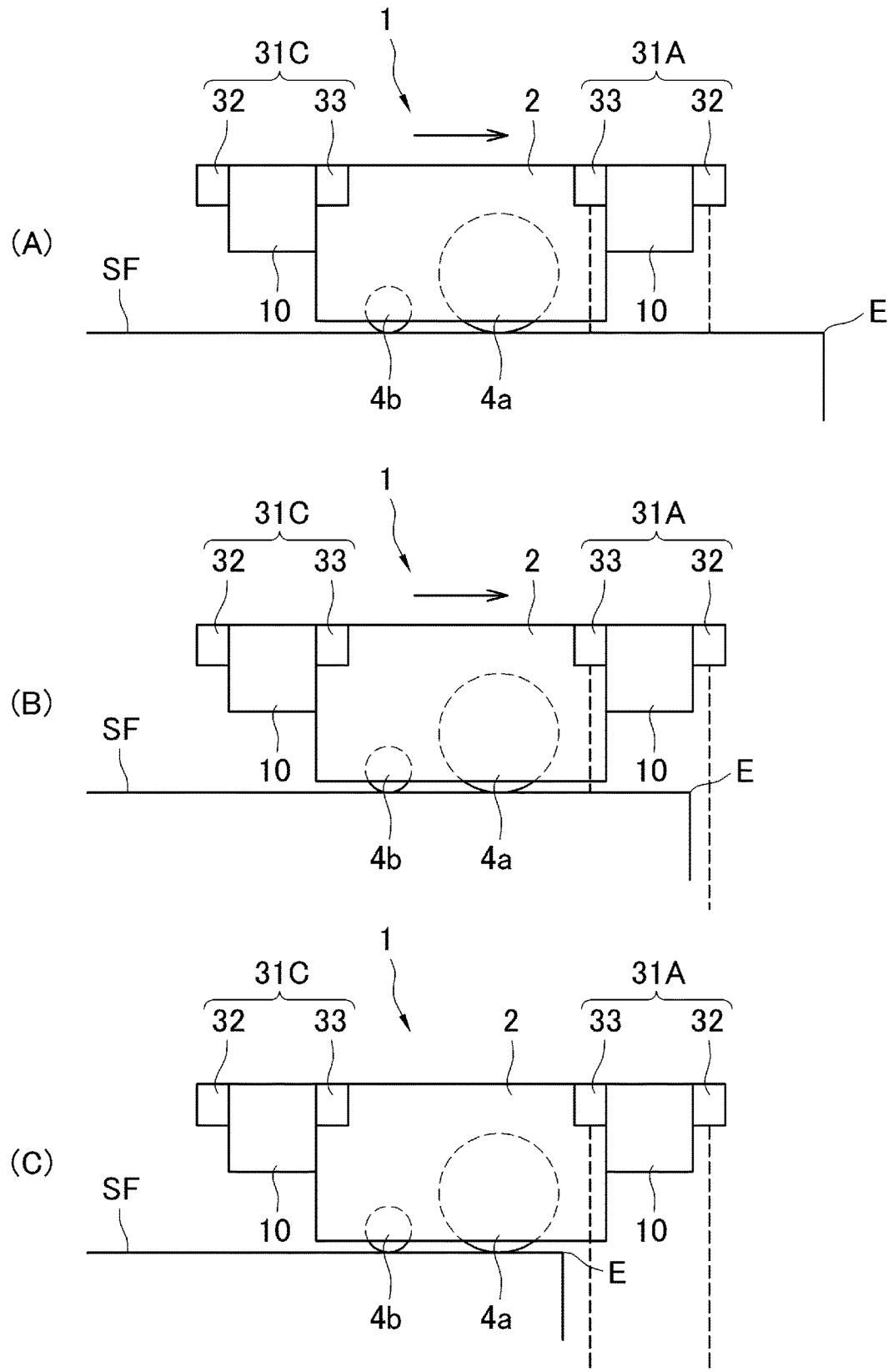
FIG. 2 is a schematic explanatory view of the operation of the self-propelled robot 1 according to the embodiment.

As shown in FIGS. 1 and 2, the plurality of edge detection units 31 are respectively provided near the side edges of the pair of the cleaning units 10, 10. Each of the edge detection units 31 includes an outer detection unit 32 and an inner detection unit 33 and is provided such that the cleaning unit 10 is sandwiched between the detection units 32 and 33.

In each of the edge detection units 31, the outer detection unit 32 is disposed so as to be positioned forward from the cleaning unit 10, of the pair of cleaning units 10, 10, which is located forward in the traveling direction of the robot main body 2 when the self-propelled robot 1 travels.

On the other hand, the inner detection unit 33 is provided so as to be located rearward relative to the outer detection unit 32 in the traveling direction of the self-propelled robot 1, in other words, between the cleaning unit 10 and the moving means 4.

For example, in the case of FIG. 1, when edge detection units 31A and 31B are provided near the side end of the upper cleaning unit 10, the detection unit located above the cleaning unit 10 is the outer detection unit 32. Then, the detection unit provided so as to sandwich the upper cleaning unit 10 with the outer detection unit 32 (the detection unit located below the upper cleaning unit 10) becomes the inner detection unit 33.

In contrast, when edge detection units 31C and 31D are provided near the side end of the lower cleaning unit 10, the detection unit located below the cleaning unit 10 is the outer detection unit 32. Then, the detection unit provided so as to sandwich the lower cleaning unit 10 with the outer detection unit 32 (the detection unit located above the lower cleaning unit 10) becomes the inner detection unit 33.

(Movement Control Method)

The following will describe a method in which based on the signal detected by the edge detection unit 31A, the control unit 30 controls the operation of the moving means 4 to prevent the self-propelled robot 1 from dropping from the target plane SF.

First, assume that the self-propelled robot 1 is traveling while working on the target plane SF, as shown in FIG. 2(A). In this case, when the robot has not reached an edge E of the target plane SF, both of the outer detection unit 32 and the inner detection unit 33 of the edge detection unit 31A detect that the target plane SF exists below them. Then, based on the signals (ON signal and OFF signal) sent from the outer detection unit 32 and the inner detection unit 33, the control unit 30 recognizes that the self-propelled robot 1 can stably travel and execute work.

When the self-propelled robot 1 further travels from the state of FIG. 2(A), it eventually reaches the edge E of the target plane SF. At this time, it is assumed that the robot is traveling while working on the target plane SF. In this case, the outer detection unit 32 detects that the target plane SF does not exist below, and transmits the corresponding signal (to be sometimes referred to as an OFF signal hereinafter) to the control unit 30 (see FIG. 2B).

On the other hand, because the target plane SF exists below the inner detection unit 33, the inner detection unit 33 transmits a signal indicating that the target plane SF exists below the inner detection unit 33 (to be sometimes referred to as an ON signal hereinafter). Then, the control unit 30 recognizes that the edge E exists between the both detection units 32 and 33. However, because the inner detection unit 33 is positioned closer to the cleaning unit 10 than the moving means 4, the control unit 30 determines that there is no possibility of dropping or running off, and causes the self-propelled robot 1 to continue traveling and working.

Note that the control unit 30 that has grasped the above situation may cause the self-propelled robot 1 to travel at the same speed as before, or may control the operation of the moving means 4 so as to slightly reduce the speed.

Further, when a special structure exists at the edge E and a special work is required at the edge E, the control unit 30 that grasps the above situation instructs the cleaning unit 10 to make special traveling and work near the edge.

Furthermore, when the self-propelled robot 1 travels, the inner detection unit 33 also reaches the edge E. Not only the outer detection unit 32 but also the inner detection unit 33 detect that the target plane SF does not exist below, and each transmit the corresponding signal to the control unit 30 (see FIG. 2(C)). Then, the control unit 30 recognizes that the work has been executed by the cleaning unit 10 up to the edge E of the target plane SF, and that there is a possibility that the moving means 4 will run off if it proceeds further. Then, the control unit 30 causes the self-propelled robot 1 to stop traveling or changes the traveling direction of the self-propelled robot 1.

As described above, disposing the cleaning unit 10 between the outer detection unit 32 and the inner detection unit 33 of the edge detection unit 31 prevents the moving means 4 from running off and causes the cleaning unit 10 to perform a work up to the edge E.

(Another Example of Movement Control)

In addition, the control unit 30 receives signals from the edge sensors of the outer detection unit 32 and the inner detection unit 33, and controls the moving means 4 so that the self-propelled robot 1 travels as follows. That is, the self-propelled robot 1 has a deceleration control function of decelerating the self-propelled robot 1 and a stop control function of stopping the self-propelled robot 1.

Control by each function will be described below with reference to FIG. 2.

First, assume that the self-propelled robot 1 is traveling while working on the target plane SF, as shown in FIG. 2(A). In this case, when the robot has not reached an edge E of the target plane SF, the outer detection unit 32 and the inner detection unit 33 detect that the target plane SF exists below. Then, based on the signals (ON signals) sent from the outer detection unit 32 and the inner detection unit 33, the control unit 30 recognizes that the self-propelled robot 1 can stably travel and execute work.

When the self-propelled robot 1 further travels from the state of FIG. 2(A), it eventually reaches the edge E of the target plane SF (FIG. 2(B)). In this case, the outer detection unit 32 detects that the target plane SF does not exist below, and transmits an OFF signal to the control unit 30. On the other hand, because the target plane SF exists below the inner detection unit 33, an ON signal is transmitted from the inner detection unit 33. Then, the control unit 30 controls the operation of the moving means 4 so as to decelerate the traveling speed of the self-propelled robot 1 (deceleration control).

When the self-propelled robot 1 travels, the target plane SF does not exist below even the inner detection unit 33 (FIG. 2(C)). When an OFF signal is transmitted from the inner detection unit 33 that has detected the above state to the control unit 30, the control unit 30 recognizes that there is a possibility that the moving means 4 may run off when it proceeds further. Then, the control unit 30 controls the operation of the moving means 4 so as to stop the self-propelled robot 1 (stop control). Because the self-propelled robot 1 stops before the moving means 4 reaches the edge E, it is possible to prevent the self-propelled robot 1 from dropping from the edge E.

As described above, when the outer detection unit 32 and the inner detection unit 33 are provided for the edge detection unit 31, it is possible to temporarily decelerate and stop the self-propelled robot 1 when the self-propelled robot 1 approaches the edge E. Then, the braking distance at the time of stopping the robot can be shortened as compared with the case where the robot suddenly stops from the normal moving speed. In other words, when the self-propelled robot 1 is stopped by the above control, even if the moving speed of the self-propelled robot 1 is higher than in the prior art, the distance from the start of braking to the stopping of braking can be set to be almost equal to that in the prior art. Accordingly, the self-propelled robot 1 can move at high speed. Even in such a case, it is possible to prevent the self-propelled robot 1 from dropping from the edge E.

Moreover, if the braking distance at the time of stopping can be shortened, even if the distance from the edge detection unit 31 to the moving means 4 is short, the self-propelled robot 1 can be stopped before the moving means 4 reaches the edge. That is, even if the length of the self-propelled robot 1 in the traveling direction is shortened, it is possible to prevent the self-propelled robot 1 from dropping from the edge E, and hence it is possible to form the self-propelled robot 1 into a compact configuration.

In the deceleration control, the moving speed may be reduced to a constant speed lower than the normal moving speed and maintained in the state, or may be gradually reduced from the normal moving speed. Alternatively, it is possible to perform control in combination of the above control operations. That is, the speed may be greatly reduced at the start of deceleration, and the speed then may be gradually lowered.

(Position of Inner Detection Unit 33)

As described above, the inner detection unit 33 may be disposed so as to be located between the cleaning unit 10 and the moving means 4 in the traveling direction of the self-propelled robot 1. The position of the inner detection unit 33 is not particularly limited. However, it is desirable that the inner detection unit 33 be disposed as close to the cleaning unit 10 as possible. If the inner detection unit 33 is disposed near the cleaning unit 10, the movement of the self-propelled robot 1 can be stopped quickly after work on the edge E is completed. After completion of the work, it is possible to quickly move the robot to the next work place or quickly switch to the next work based on a signal from the inner detection unit 33. Therefore, unnecessary movement and work can be reduced as much as possible, and hence the work performed by the self-propelled robot 1 can be made more efficient.

(Position of Edge Detection Unit 31 in Width Direction)

FIG. 1 shows the case where each of the edge detection units 31 is provided near the side edge of the cleaning unit 10. However, the position where each edge detection unit 31 is provided is not particularly limited as long as it satisfies the above configuration. For example, the edge detection unit 31 may be provided in the central portion of the cleaning unit 10 in the width direction. Even in this case, it is possible to grasp the position of the edge E (see FIG. 8(B)).

However, as described above, when each of the edge detection units 31 is provided near the side edge of the cleaning unit 10, it is possible to grasp the relative position between the cleaning unit 10 and the side end portion of the target plane SF. Then, it is possible to prevent the self-propelled robot 1 from dropping or running off the side edge E.

Moreover, as long as the position of the edge detection unit 31 is located inward from the side end of the cleaning unit 10 or at the same position as that of an end portion of the cleaning unit 10 and located outward from the moving means 4, the cleaning unit 10 can execute work up to the side edge E of the target plane SF.

For example, when the edge detection unit 31 is disposed as described above, even if the edge detection unit 31 detects a state in which the target plane SF does not exist below, the distance to the side edge E is secured to a certain extent for the moving means 4. This prevents the wheels or the like of the moving means 4 from running off. In particular, when the position of the edge detection unit 31 is located inward from the side end of the cleaning unit 10, even if the edge detection unit 31 detects a state where the target plane SF does not exist below, the side end of the cleaning unit 10 is located outward from the side edge E of the target plane SF. That is, the cleaning unit 10 has been already working on the side edge E of the target plane SF. In other words, it is possible to work with the cleaning unit 10 up to the side edge E of the target plane SF.

Accordingly, when the edge detection unit 31 is located inward from the side end of the cleaning unit 10 and located outward from the moving means 4, the cleaning unit 10 can execute work up to the side edge E of the target plane SF. In addition, this can prevent the wheels or the like of the moving means 4 from running off.

In the above description, the phrase "the position of the edge detection unit 31 is located inward from the side end of the cleaning unit 10 or at the same position as that of an end portion of the cleaning unit 10" means that the position where the edge detection unit 31 can detect the edge E coincides with the edge on which the cleaning unit 10 can perform a cleaning operation. That is, as shown in FIGS. 3 and 4, in the case where the cleaning unit 10 has the brush 12, the edge of the portion where the brush is provided in the axial direction of the brush 12 almost coincides with the position where the edge detection unit 31 can detect the edge E.

(Relative Positions of Outer Detection Unit 32 and Inner Detection Unit 33)

In the above example, the edge detection unit 31 is placed such that the outer detection unit 32 and the inner detection unit 33 are aligned along the traveling direction (vertical direction in FIG. 1) of the self-propelled robot 1. However, the outer detection unit 32 and the inner detection unit 33 may be disposed at positions shifted from each other in the width direction of the cleaning unit 10 (see FIGS. 7(B) and 8(A)).

A case where the edge detection unit 31 is placed such that the outer detection unit 32 and the inner detection unit 33 are arranged in the traveling direction (vertical direction in FIG. 1) of the self-propelled robot 1 so as to sandwich the cleaning unit 10 has been described. However, the edge detection unit 31 need not necessarily be disposed so as to sandwich the cleaning unit 10. When both of the outer detection unit 32 and the inner detection unit 33 are disposed outward from the moving means 4, it is possible to prevent the self-propelled robot 1 from dropping or running off on the basis of the signals detected by the outer detection unit 32 and the inner detection unit 33. For example, both the outer detection unit 32 and the inner detection unit 33 may be arranged outward from the cleaning unit 10 (FIG. 6(B)), or both the outer detection unit 32 and the inner detection unit 33 may be arranged inwardly from the cleaning unit 10 (FIG. 7(A)).

(Groove Detection)

When there is a groove or the like in the target plane SF, the outer detection unit 32 and the inner detection unit 33 determine that the edge of the groove is also the edge of the target plane SF. However, processing signals from the outer detection unit 32 and the inner detection unit 33 as described below makes it possible to determine whether the detected edge is the edge of the groove or the edge of the target plane SF. That is, when there is a groove in the target plane SF, it is possible to prevent the self-propelled robot 1 from stopping by erroneously recognizing the edge of the groove as the edge of the target plane SF.

First, while the robot is traveling on the target plane SF, both of the outer detection unit 32 and the inner detection unit 33 send, to the control unit 30, ON signals notifying that the target plane SF exists below them. In this state, the self-propelled robot 1 travels normally (FIG. 5(A)).

When the self-propelled robot 1 reaches the edge E of the target plane SF, the target plane SF does not exist below both the outer detection unit 32 and the inner detection unit 33. When this state occurs, both the outer detection unit 32 and the inner detection unit 33 transmit OFF signals notifying that the target plane SF does not exist below them. Then, the self-propelled robot 1 stops traveling (see FIG. 2(C)).

Figure 5:
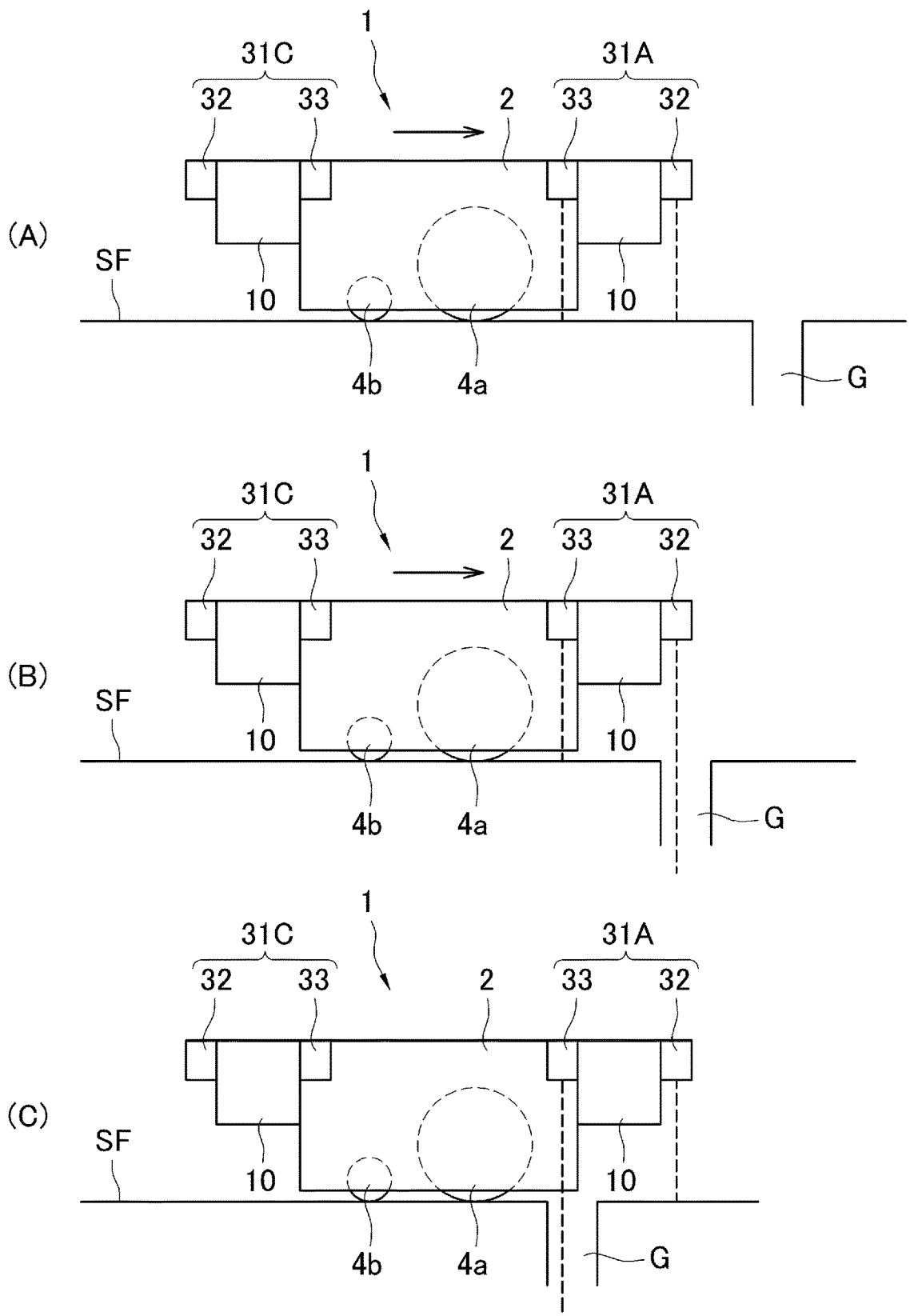
FIG. 5 is a schematic explanatory view of the operation of the self-propelled robot 1 according to the embodiment which travels on a target plane SF having a groove G.
Figure 6:
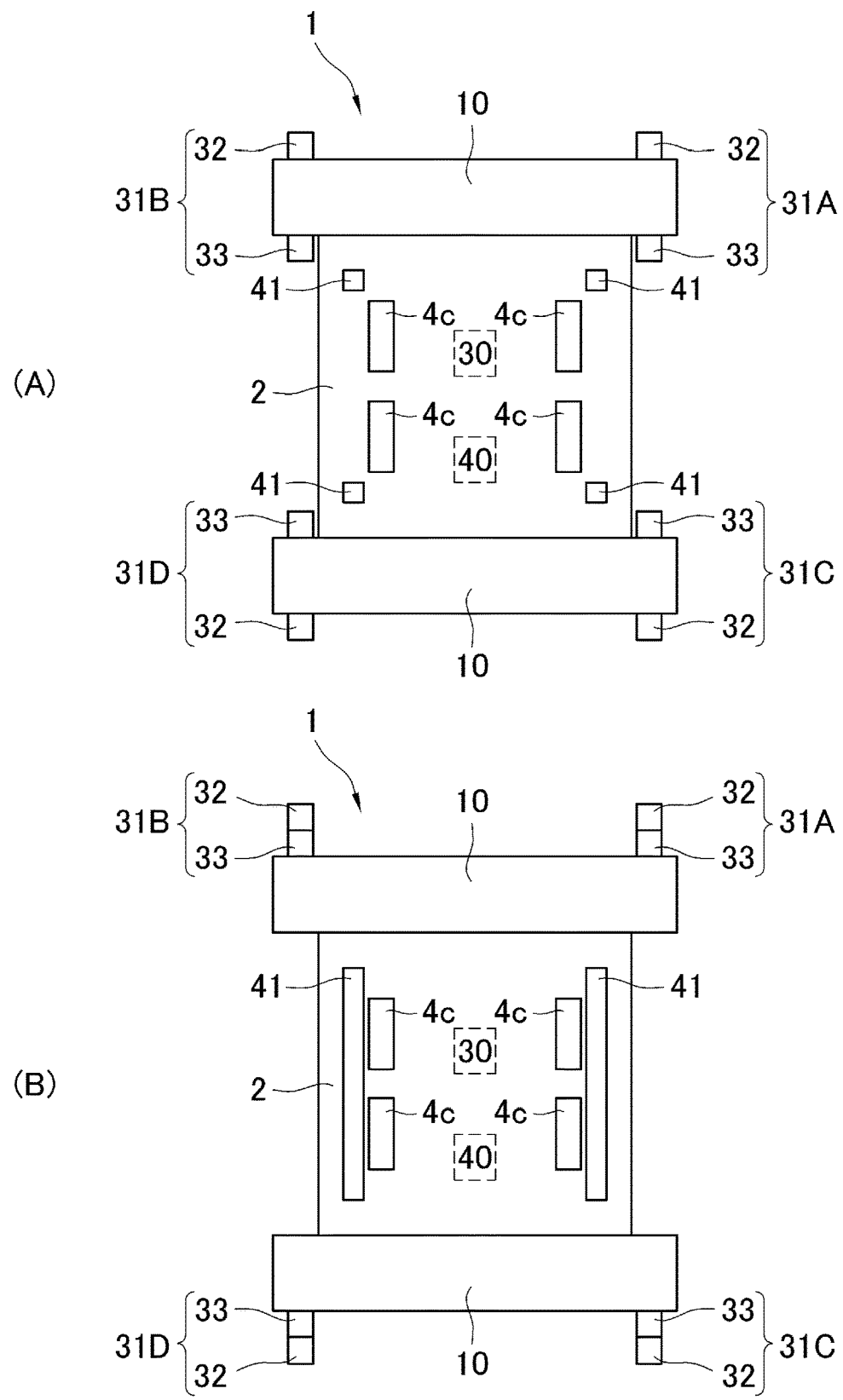
FIG. 6 is a schematic plan view of a self-propelled robot 1 according to another embodiment.
Figure 7:
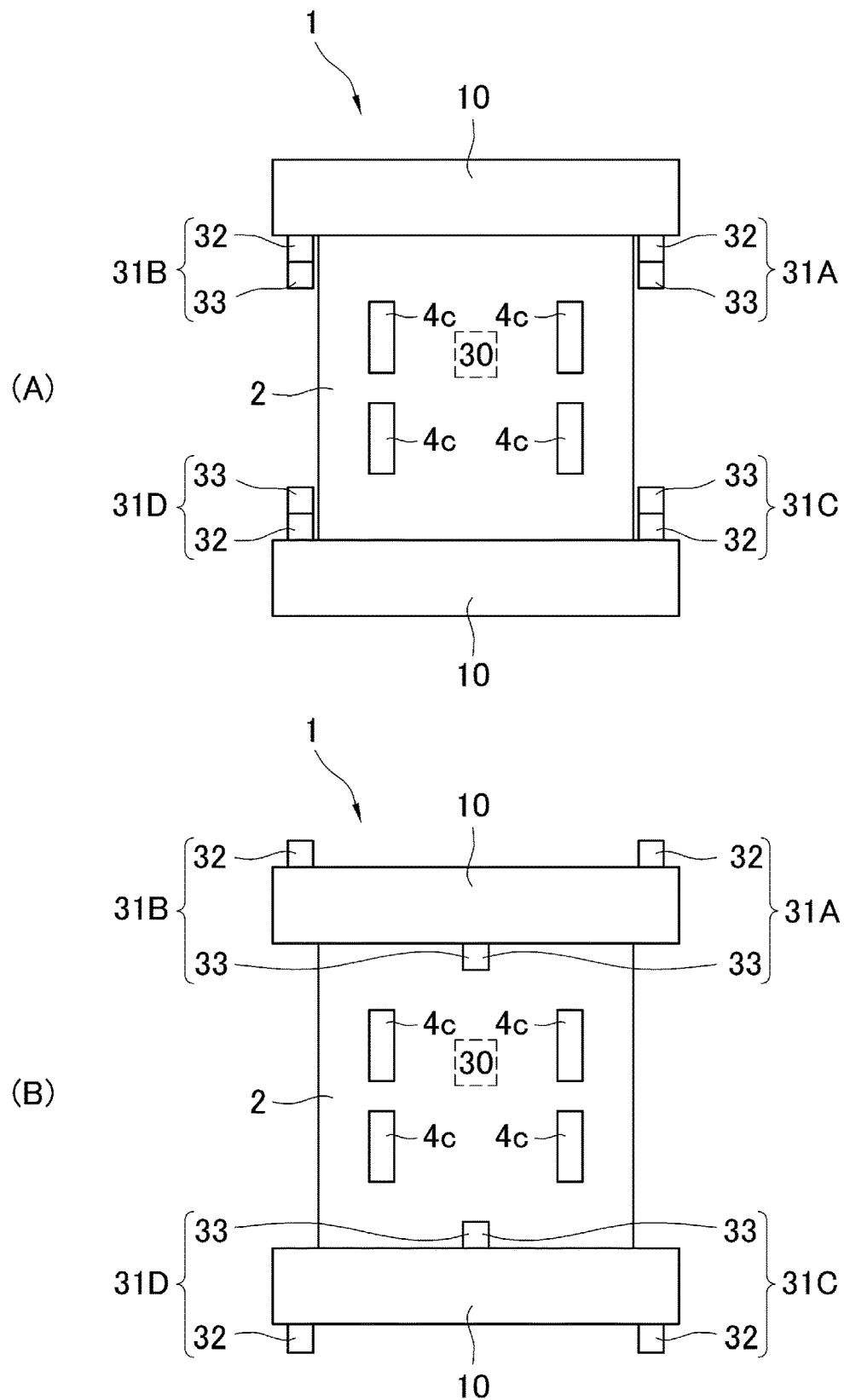
FIG. 7 is a schematic plan view of a self-propelled robot 1 according to another embodiment.

On the other hand, as shown in FIG. 5, assume that there is a groove G in the target plane SF. In this case, when the outer detection unit 32 is positioned at the position of the groove G, the signal transmitted from the outer detection unit 32 to the control unit 30 is switched from an ON signal to an OFF signal (FIG. 5(B)). At this time, because the target plane SF exists below the inner detection unit 33, an ON signal is kept transmitted from the inner detection unit 33 to the control unit 30.

When the self-propelled robot 1 further travels, the outer detection unit 32 passes through the groove G and the target plane SF exists again below the outer detection unit 32. Then, the signal transmitted from the outer detection unit 32 to the control unit 30 is switched from an OFF signal to an ON signal (FIG. 5(C)).

On the other hand, when the self-propelled robot 1 travels, because the inner detection unit 33 is arranged at the position of the groove G, the signal transmitted from the inner detection unit 33 to the control unit 30 is switched from an ON signal to an OFF signal.

In this case, when both the outer detection unit 32 and the inner detection unit 33 are arranged so as not to detect the groove G at the same time, the signal transmitted from the outer detection unit 32 to the control unit 30 becomes an ON signal before the signal transmitted from the inner detection unit 33 to the control unit 30 becomes an OFF signal. That is, because the signals transmitted from both the outer detection unit 32 and the inner detection unit 33 to the control unit 30 do not become OFF signals, even if the groove G exists, the self-propelled robot 1 can continue traveling. In other words, because the edge of the groove G of the target plane SF is not erroneously recognized as the edge E of the target plane SF, even if there is the groove G in the target plane SF, the self-propelled robot 1 can continue traveling.

Note that when the above-described groove G is to be detected, the outer detection unit 32 and the inner detection unit 33 need to be disposed so as not to detect the groove G at the same time. That is, it is necessary to appropriately set the distance between the outer detection unit 32 and the inner detection unit 33 in the traveling direction of the self-propelled robot 1. For example, when the outer detection unit 32 and the inner detection unit 33 detect the presence/absence of the target plane SF by laser sensors, the outer detection unit 32 and the inner detection unit 33 are disposed such that the distance between them is longer than the width W of the groove G. Because the outer detection unit 32 and the inner detection unit 33 do not detect the groove G at the same time, even if there is the groove G, the self-propelled robot 1 can continue traveling without stopping traveling.

(Other Configurations of Outer Detection Unit 32 and Inner Detection Unit 33)

In the example described above, a case where the outer detection unit 32 and the inner detection unit 33 of the edge detection unit 31 each have one sensor has been described. When the outer detection unit 32 and the inner detection unit 33 each have a plurality of sensors, the following functions can be exerted.

The following will describe a case where the outer detection unit 32 and the inner detection unit 33 each have two sensors. In the following description, a case where the outer detection unit 32 and the inner detection unit 33 are disposed so as to sandwich the cleaning unit 10 will be described as a representative. Further, the following will describe a case where the control unit 30 executes deceleration processing when the outer detection unit 32 transmits an OFF signal.

Figure 9:
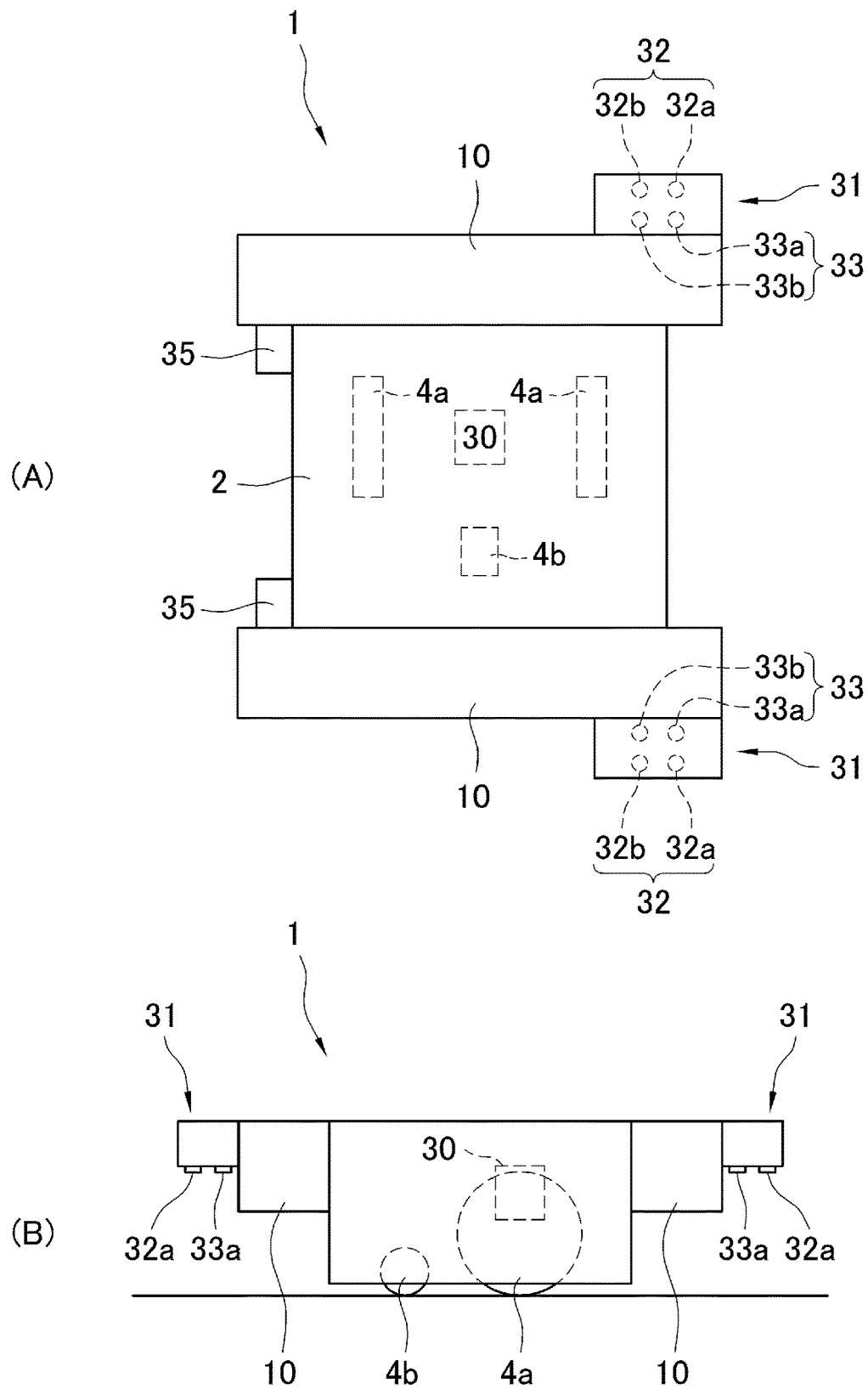
FIG. 9 is a schematic plan view of the self-propelled robot 1 having an edge detection unit 31 with an outer detection unit 32 and an inner detection unit 33 each having a plurality of sensors.

As shown in FIG. 9, the outer detection unit 32 includes a pair of edge sensors 32a and 32b. The pair of edge sensors 32a and 32b are arranged so as to be aligned along a width direction orthogonal to the traveling direction of the self-propelled robot 1 (simply referred to as a width direction hereinafter). Each of the pair of edge sensors 32a and 32b has a function of detecting the edge E of the target plane SF and has a function of transmitting, to the control unit 30, a signal representing that the edge E has been detected.

The inner detection unit 33 also includes a pair of edge sensors 33a and 33b. The pair of edge sensors 33a and 33b are arranged so as to be aligned along the width direction of the self-propelled robot 1. That is, the above edge sensors are arranged so as to be substantially parallel to the pair of edge sensors 32a and 32b of the outer detection unit 32. In addition, each of the pair of edge sensors 33a and 33b has a function of detecting the edge E of the target plane SF and has a function of transmitting, to the control unit 30, a signal representing that the edge E has been detected.

(Profiling Movement Control)

As described above, in a case where the outer detection unit 32 and the inner detection unit 33 of the edge detection unit 31 each have a plurality of sensors, controlling the moving means 4 in the following manner can move the self-propelled robot 1 along an edge (to be referred to as a side edge SE hereinafter) parallel to the traveling direction of the self-propelled robot 1. That is, a profiling movement control function is provided to move the self-propelled robot 1 along the side edge SE.

Control by the profiling movement control function will be described below with reference to FIG. 10.

Referring to FIG. 10, each filled-in sensor shows a sensor that has detected the target plane SF, and each blank sensor shows a sensor that has detected the side edge SE (in other words, a sensor that has not detected the target plane SF).

FIG. 10 shows a state in which the self-propelled robot 1 is moving upward (the direction of an arrow DR, i.e., the traveling direction of the self-propelled robot 1). As shown in FIG. 10, the operation of the moving means 4 is controlled such that the self-propelled robot 1 normally moves in the direction of the arrow DR while slightly moving toward the side edge SE. That is, the operation of the moving means 4 is controlled to move the self-propelled robot 1 in the direction of an arrow a.

Note that "normal" in this case means a state in which the target plane SF exists below all the edge sensors of the outer detection unit 32 and the inner detection unit 33.

As shown in FIG. 10, when the self-propelled robot 1 (the lowest stage in FIG. 10) moves in the direction of the arrow a, the self-propelled robot 1 moves while slightly inclining and finally reaches the side edge SE (see the self-propelled robot 1 in the second stage from the bottom in FIG. 10). Then, the target plane SF does not exist below the edge sensor 32a of the outer detection unit 32 which is positioned outside in the width direction. When this state is detected, a signal is transmitted from the edge sensor 32a to the control unit 30. At this time, the control unit 30 checks signals from other edge sensors. When other edge sensors (or other edge sensors except for the edge sensor 32a) transmit signals representing the presence of the target plane SF below them, the control unit 30 determines that the edge sensor 32a of the outer detection unit 32 has detected the side edge SE. The control unit 30 then controls the operation of the moving means 4 such that the self-propelled robot 1 moves in a direction away from the side edge SE side. That is, the operation of the moving means 4 is controlled so as to move the self-propelled robot 1 in the direction of an arrow b (see the self-propelled robot 1 in the second stage from the bottom in FIG. 10).

As shown in FIG. 10, when the self-propelled robot 1 moves in the direction of the arrow b, the self-propelled robot 1 moves away from the side edge SE while slightly inclining (see self-propelled robot 1 in the second stage from the bottom in FIG. 10). The edge sensor 32a of the outer detection unit 32 then detects again that the target plane SF exists below, and transmits the corresponding signal to the control unit 30. At this time, the control unit 30 checks signals from other edge sensors (or other edge sensors except for the edge sensor 32a). When other edge sensors transmit signals representing the presence of the target plane SF below them, the control unit 30 controls the moving means 4 so as to make the self-propelled robot 1 normally travel (see the self-propelled robot 1 in the second stage from the bottom in FIG. 10).

When the self-propelled robot 1 enters the normal traveling state, the self-propelled robot 1 moves again toward the side edge SE. When the edge sensor 32a of the outer detection unit 32 detects that the target plane SF does not exist below, the self-propelled robot 1 moves again in a direction away from the side edge SE. When the edge sensor 32a of the outer detection unit 32 then detects again that the target plane SF exists below, the self-propelled robot 1 enters a normal traveling state.

With the above control, when the self-propelled robot 1 moves while switching the traveling state as described above, it is possible to move the self-propelled robot 1 along the side edge SE while slightly swinging the robot in the lateral direction with respect to the traveling direction (that is, with respect to the side edge SE).

Assume that the self-propelled robot 1 reaches the edge E in the traveling direction (see the self-propelled robot 1 in the uppermost stage in FIG. 10), and both of the pair of edge sensors 32a and 32b of the outer detection unit 32 detect that the target plane SF does not exist below. In this case, the traveling speed of the self-propelled robot 1 is reduced. At this time, when the edge sensor 32a of the outer detection unit 32 detects that the target plane SF does not exist below, the self-propelled robot 1 moves in a direction away from the side edge SE (the direction of the arrow b). That is, because the self-propelled robot 1 is controlled to be decelerated under profiling movement control, the robot moves so as to further approach the edge E in a direction away from the side edge SE while decelerating.

When both the pair of edge sensors 33a and 33b of the inner detection unit 33 detect that the target plane SF does not exist below, the self-propelled robot 1 is stopped. That is, deceleration control and stop control can be performed while moving the self-propelled robot 1 by profiling control.

Note that profiling control is also performed while deceleration control is performed. During this period, depending on whether the target plane SF exists below the edge sensor 33a of the inner detection unit 33 while the target plane SF does not exist below the edge sensor 32a of the outer detection unit 32, the movement of the robot is switched between the direction approaching the side edge SE (the direction of the arrow a) and the direction away from the side edge SE (the direction of the arrow b).

(Outer Detection Unit 32 and Inner Detection Unit 33)

In the speed control and the stop control described above, it suffices that the outer detection unit 32 and the inner detection unit 33 each include at least one edge sensor. However, providing the pair of edge sensors 32a and 32b for the outer detection unit 32 makes it possible to perform deceleration control only when both of the edge sensors 32a are in the same state (the state in which the target plane SF does not exist below). Then, even if only the edge sensor 32a on the outer side (the side edge SE side) of the outer detection unit 32 detects the side edge SE, the deceleration control is not performed, and hence the self-propelled robot 1 can stably travel in the traveling direction.

Providing the pair of edge sensors 33a and 33b for the inner detection unit 33 makes it possible to perform stop control only when both the edge sensors are in the same state (the state in which the target plane SF does not exist below). Then, even if only the edge sensor 33a on the outer side (the side edge SE side) of the inner detection unit 33 detects the side edge SE when profiling control is executed while deceleration control is executed, stop control is not performed, and hence the self-propelled robot 1 can stably travel even during deceleration control.

Note that when the profiling control is not performed during deceleration control, the inner detection unit 33 may be provided with only the edge sensor 32b positioned inward from the edge sensor 32a on the outer side (the side edge SE side) of the outer detection unit 32.

On the other hand, when only speed control and stop control are to be executed, the outer detection unit 32 and the inner detection unit 33 each may have only one edge sensor. In this case, whether the end edge E or the side end edge SE positioned in the traveling direction of the self-propelled robot 1 cannot be determined only from signals detected by the outer detection unit 32 and the inner detection unit 33. Therefore, it is desirable to separately provide a sensor for detecting the side edge SE.

When only profiling movement control is to be performed without executing speed control and stop control based on signals from the outer detection unit 32 and the inner detection unit 33, the profiling control can be executed by letting the outer detection unit 32 and the inner detection unit 33 each have one edge sensor. Further, it is unnecessary to provide both the outer detection unit 32 and the inner detection unit 33, and it is possible to perform profiling movement control even if only one of them is provided.

(Inclination Prevention Sensor 35)

As shown in FIG. 9, an inclination prevention sensor 35 may be provided at a position away from the edge detection unit 31 in the width direction, inward from the edge detection unit 31, and outward from the moving means 4.

As described above, because the self-propelled robot 1 moves toward the side edge SE during normal traveling, its axial direction (that is, traveling direction) is inclined with respect to the direction of the side edge SE. On the other hand, when the edge sensor 32a of the outer detection unit 32 detects the side edge SE, the self-propelled robot 1 is inclined in the opposite direction. Therefore, the inclination of the self-propelled robot 1 in the axial direction swings within a certain range with respect to the direction of the side edge SE. However, when the self-propelled robot 1 is disposed at a position far away from the side edge SE, the inclination of the self-propelled robot 1 in the axial direction increases. If such a state occurs near the edge E in the traveling direction, there is a possibility that the moving means 4 will run off.

However, if the inclination prevention sensor 35 is provided at the above-described position, the inclination prevention sensor 35 can detect the absence of the target plane SF below the inclination prevention sensor 35 before, for example, the moving means 4 runs off. In this case, when the inclination prevention sensor 35 transmits, to the control unit 30, a signal indicating that the target plane SF does not exist below, the control unit 30 can stop the movement of the self-propelled robot 1 by stopping the moving means 4 before it runs off.

(Danger Control Unit 40)

Assume that the edge detection unit 31 is provided and the operation of the moving means 4 is controlled by the control unit 30 as described above. In this case, when the edge detection unit 31 and the control unit 30 are operating normally, it is possible to appropriately prevent the self-propelled robot 1 from dropping from the target plane SF.

However, when the edge detection unit 31 cannot properly detect the edge E of the target plane SF due to a failure or the like, there is a possibility that the self-propelled robot 1 will run off or drop from the target plane SF.

Therefore, a danger detection unit 41 that detects the edge E of the target plane SF may be provided independently of the edge detection unit 31. Specifically, as shown in FIG. 6(A), the danger detection unit 41 is provided between the edge detection unit 31 and the moving means 4 in the traveling direction of the self-propelled robot 1, and when the danger detection unit 41 detects the edge E of the target plane SF, the control unit 30 causes the self-propelled robot 1 to stop traveling. Even when the edge detection unit 31 does not detect the edge E of the target plane SF, the danger detection unit 41 can detect the edge E of the target plane SF before the moving means 4 reaches the edge E of the target plane SF. Therefore, even when the edge detection unit 31 does not detect the edge E of the target plane SF, it is possible to prevent the self-propelled robot 1 from running off or dropping from the target plane SF.

In the case where the danger detection unit 41 is provided, the control unit 30 may be provided with a function of informing the operator or the like that the self-propelled robot 1 has been stopped based on a signal from the danger detection unit 41. By informing the operator or the manager that the self-propelled robot 1 is out of order, it is possible to repair the self-propelled robot 1 quickly. For example, an alarm device or an indicator may notify the operator of the failure, or a signal may be transmitted to the portable terminal of the operator, the management center or the like to transmit the information concerning the failure.

Assume that the control unit 30 is, for example, out of order. In this case, even if the edge detection unit 31 detects the edge E of the target plane SF, the self-propelled robot 1 may not stop traveling and may drop from the target plane SF. In contrast to this, when a danger control unit 40 for controlling the moving means 4 in accordance with a signal from the danger detection unit 41 is provided separately from the control unit 30, even if the control unit 30 is, for example, out of order, it is possible to prevent the self-propelled robot 1 from running off or dropping from the target plane SF.

In this case, the danger control unit 40 may be provided with a function of informing the operator or the like that the self-propelled robot 1 has been stopped traveling. By informing the operator or the manager that the self-propelled robot 1 is out of order, it is possible to repair the self-propelled robot 1 quickly. For example, an alarm device or an indicator may notify the operator of the failure, or a signal may be transmitted to the portable terminal of the operator, the management center or the like to transmit the information concerning the failure. In addition, by inputting a signal from the edge detection unit 31 to the danger control unit 40, it is also possible to recognize which of the edge detection unit 31 and the control unit 30 is damaged. Then, when repairing the self-propelled robot 1, the operator can easily grasp the problem, and hence the time to restore can also be shortened.

The structure of the danger detection unit 41 is also not particularly limited. However, when the danger detection unit 41 has an outer sensor and an inner sensor so as to be aligned in the moving direction of the self-propelled robot 1 (see the edge detection unit 31 in FIG. 9), the possibility of erroneously detecting a groove or the like as the edge E of the target plane SF can be reduced.

Even if the danger detection unit 41 has only one sensor, placing the danger detection unit 41 at a position shifted in the moving direction of the self-propelled robot 1 can reduce the possibility of erroneously detecting a groove or the like as the edge E of the target plane SF.

(Example of Sensor)

Note that the sensors used for the edge detection unit 31 and the danger detection unit 41 are not particularly limited, and known sensors can be used. For example, it is possible to use a sensor configured to contactlessly detect an edge, such as a laser sensor, an infrared sensor, or an ultrasonic sensor or a contact type sensor such as a limit switch. In addition, an image captured using a CCD camera or the like as a sensor may be analyzed by the control unit 30 to detect an edge. Furthermore, it is also possible to use a temperature sensor or a capacitance sensor as a sensor. When these sensors are used, it is possible to recognize the edge of the target plane SF from the difference in temperature and capacitance between the target plane SF and the portion (space or the like) outside the edge.

For example, when the sensor is a laser sensor, it is possible to detect whether the target plane SF exists, as follows. First, assume that the target plane SF exists immediately below the sensor. In this case, upon emitting laser light, the sensor receives the reflected light reflected by the target plane SF. That is, it can be determined that the position of the sensor is located inward from the edge. On the other hand, when the sensor cannot receive reflected light, it can be determined that the target plane SF is not directly below the sensor, that is, the position of the sensor is located outside the edge.

(Running-Off Prevention Function)

Further, in preparation for the failure of the danger detection unit 41, a running-off detecting sensor 42 for detecting running-off may be provided (see FIG. 6(B)).

Figure 8:
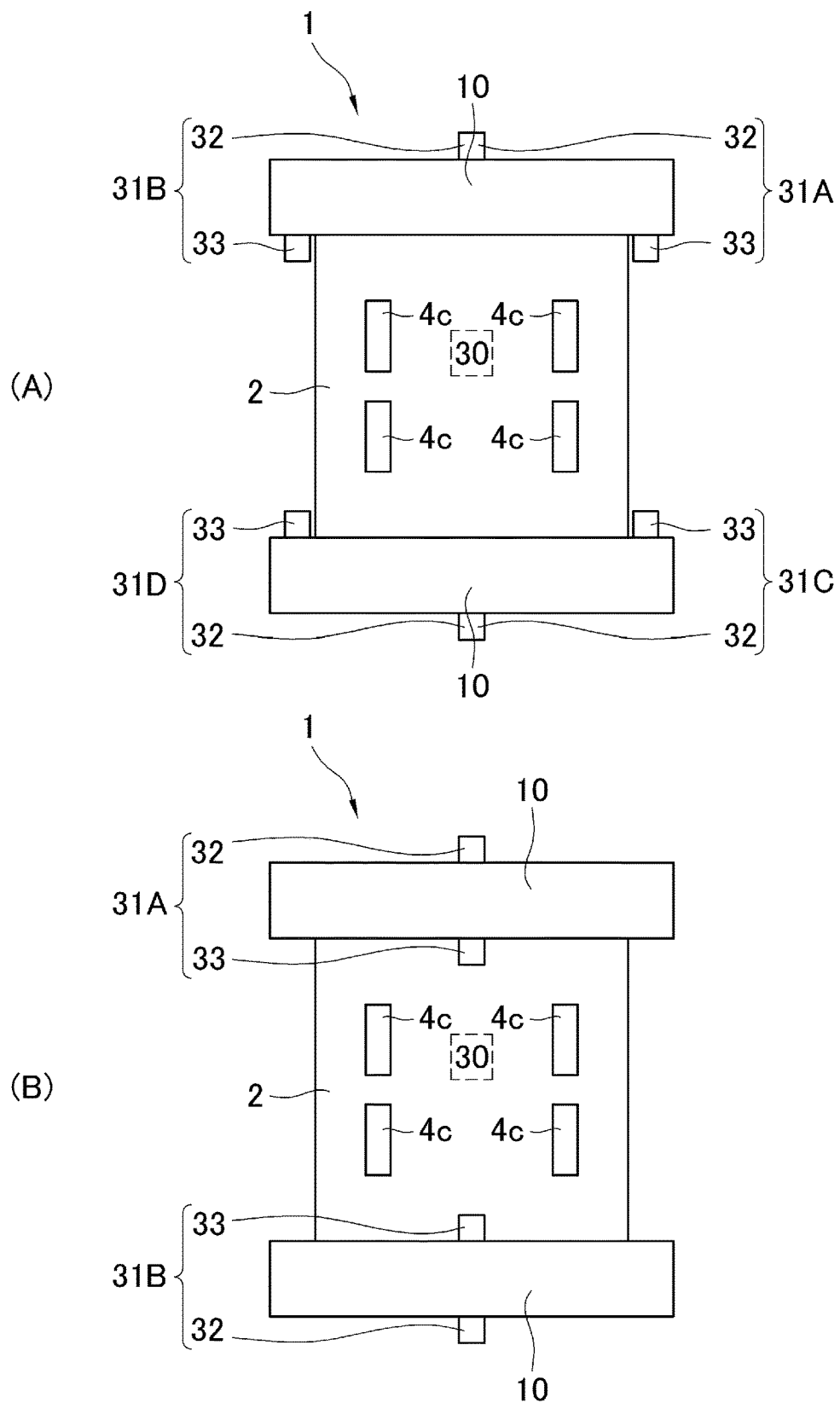
FIG. 8 is a schematic plan view of a self-propelled robot 1 according to another embodiment.

For example, as shown in FIG. 8, a contact type sensor 42 electrically connected to the danger control unit 40 (or the control unit 30) is provided on the lower surface of the robot main body 2. When running-off occurs, the lower surface of the robot main body 2, that is, the contact type sensor 42, comes into contact with the edge of the target plane SP, so that it is possible to detect the running-off. When the contact type sensor 42 detects that it has come into contact with the target plane SF and transmits a signal to the danger control unit 40 (or the control unit 30), the danger control unit 40 (or the control unit 30) which received the signal stops the operation of the driving unit of the moving means 4. For example, when a motor is used as the driving unit, the supply of a current to the motor is stopped. Because no force is applied to move the self-propelled robot 1 in the direction of the edge, the robot main body 2 can be prevented from dropping from the target plane SF.

Note that upon receiving a signal that the contact type sensor 42 has come into contact with the target plane SF, the danger control unit 40 (or the control unit 30) may cause the driving unit to operate to generate drive resistance in the wheels 4a and 4b. This can further enhance the effect of preventing the robot main body 2 from dropping from the target plane SF. For example, when a motor is used for the driving unit, a current may be supplied to the motor to reverse the rotating direction of the motor. In addition, a braking device such as an electromagnetic brake may be provided for the driving unit, or a short brake function may be implemented, which obtains a braking force by causing short-circuiting between the terminals of the motor.

The sensor used as the above-described contact sensor 7 is not particularly limited. For example, it is possible to use a pressure sensitive rubber switch or the like called a cable switch (available from Azbil Corporation) or a tape switch (available from Tokyo Sensor) (see FIG. 6(B)). The position at which the contact type sensor 42 is provided is also not particularly limited. For example, in the case of using a cable switch, a tape switch, or the like, a cable switch, a tape switch, or the like may be installed so as to be parallel to the rotating plane of the wheel 4c (or the wheel 4a in FIG. 1). Further, when a planar sensor is used, the sensor may be provided on the entire lower surface of the robot main body 2.

(Operation of Self-Propelled Robot 1)

The self-propelled robot 1 described above causes the control unit 30 to control the operation of the moving means 4 and work such as cleaning. For this reason, controlling the operation of the self-propelled robot 1 to make it nearly automatically travel along a route or the like stored in the control unit 30 allows the robot to execute work such as cleaning while moving on the target plane SF.

On the other hand, the self-propelled robot 1 may be externally operated by an operator to control traveling and work such as cleaning. For example, the self-propelled robot 1 may be remotely operated using radio communication using radio, infrared rays, or the like. In other words, the self-propelled robot 1 may be remotely operated by the operator operating a wireless communication controller. In addition, the operator may operate the self-propelled robot 1 using a controller connected to the self-propelled robot 1 via a signal line or the like. Operating the self-propelled robot 1 using a controller for wireless communication or a controller connected via a signal line allows the operator to perform work such as cleaning while checking the progress of the work. Then, it is possible to cause the self-propelled robot 1 to perform appropriate work in accordance with changes in surrounding situations and the like.

As described above, even when the operator controls the operation of the self-propelled robot 1, it is desirable that the operator has the edge detection function as described above. Having such a function allows the self-propelled robot 1 to make it appropriately travel and execute work even if the operator makes a mistake. In addition, even if the operator makes a mistake, it is possible to prevent the self-propelled robot 1 from dropping from the target plane SF.

The self-propelled robot 1 may adopt both manual operation performed by the operator and automatic traveling (operation). In other words, the robot normally performs work or travels automatically (that is, under the control of only the control unit 30), and when the operator performs an input operation via a controller or the like, the automatic traveling (operation) state is switched to the manual operation performed by the operator. In this case, when no input operation is performed via the controller or the like for a predetermined period or more, the manual operation state is switched to the automatic traveling (working) state. Then even if the operator makes an operation error or fails to switch the manual operation state to the automatic traveling (work) state, it is possible to continue the work, thus providing a preferable effect.

INDUSTRIAL APPLICABILITY

The self-propelled robot according to the present invention can be used for cleaning of planes of a solar cell array of a large-scale solar power generation facility, a collector mirror of a solar thermal power generation facility, a light-receiving surface of a solar water heater, and the like, defect inspection on the plane, measurement of a surface shape or the thickness of a member, measurement of a temperature, measurement of surface roughness, measurement of the light reflectance and glossiness of the surface, measurement of other physical quantities, collection and observation, separation of surface deposits and painting, painting, preliminary treatment before painting, coating work, pasting of a film or the like, polishing, marking, communication and the like by information presentation, and the like.

DESCRIPTION OF REFERENCE SIGNS 1 self-propelled robot
2 robot main body
4 moving means
10 cleaning unit
12 brush
30 control unit
31 edge detection unit
32 outer detection unit
32a edge sensor
32b edge sensor
33 inner detection unit
33a edge sensor
33b edge sensor
40 danger control unit
41 danger detection unit
42 contact sensor
SP structure
SF target plane

The invention claimed is:

1. A self-propelled robot that autonomously travels on a structure having a plane and performs a work on the plane of the structure, the robot comprising:
   a robot main body;
   a moving means that is provided with the robot main body and is configured to autonomously travels such that the robot moves in a traveling direction;
   a working unit that performs the work on the plane,
   a control unit that controls movements of the robot main body including the moving means and the working unit; and
   an edge detection unit that detects an edge of the plane, being connected to the control unit, wherein
   the edge detection unit is configured with at least two detection units that are
     an outer detection unit that is located at a leading side of the moving means in the traveling direction and
     an inner detection unit that is located at the leading side of the moving means and at a trailing side of the outer detection unit in the traveling direction such that the inner detection unit intervenes between the moving means and the outer detection unit in the traveling direction, and
   the inner detection unit is further located at a trailing side of the working unit in the traveling direction such that the inner detection unit intervenes between the working unit and the moving means in the traveling direction, and
   the working unit intervenes between the inner detection unit and the outer detection unit.

2. The self-propelled robot according to claim 1, wherein the working unit is configured with a working device, and the inner detection unit is disposed near the working device.

3. The self-propelled robot according to claim 1, wherein defining a width direction that is perpendicular to the traveling direction, the robot main body, the moving means and the working unit each have a pair of end portions with respect to the width direction, the end portions being positioned at right and left sides thereof, when the edge detection unit is provided at one of the end portions of the robot main body wherein the one of the end portions of the robot main body is defined as a target end portion, the edge detection unit is further located
   inward from an end portion of the working device in the width direction, which is at the same side as the target end portion, and
   outward from an end portion of the moving means in the width direction, which is at the same side as the target end portion.

4. The self-propelled robot according to claim 1, further comprising:
   a danger detection unit that
     is configured to detect whether or not the plane exists beneath the danger detection unit, and
     is disposed between the inner detection unit and the moving means in the traveling direction; and
   a danger avoidance control unit that is connected to the moving means and the danger detection unit, wherein
   when detecting that the plane does not exist beneath the danger detection unit, the danger detection unit sends a signal to the danger avoidance control unit, and the danger avoidance control unit stops the movement of the moving means based on the signal so that the robot does not move forward after the signal is generated.

5. The self-propelled robot according to claim 1, further comprising:
   a contact type sensor that is arranged on a lower surface of the robot main body wherein the sensor has a tip projecting downward from the lower surface and is configured to detect whether or not the tip of the sensor contacts to the plane, sending a signal to the control unit when the tip contacts to the plane, the signal indicating that the lower surface becomes too close to the plane, wherein
   the plane of the structure has a rail, which is a linear ditch, along which the robot is expected to travel, the tip of the sensor not contacting to the plane while the robot travels along the rail, and
   when the signal is generated by the tip of the sensor contacting to the plane and sent to the control unit, the control unit stops the movement of the moving means so that the robot does not move forward after the signal is generated.

6. The self-propelled robot according to claim 1, wherein the control unit further has a deceleration control function by which the control unit decrease a traveling speed of the robot,
   when the outer detection unit detects the edge of the plane, the control unit executes the deceleration control function, causing the moving means to decrease the traveling speed of the robot,
   when the inner detection unit detects the edge of the plane after the outer detection unit detects the edge of the plane, the control unit causes the moving means to stop the movement.

7. The self-propelled robot according to claim 6, wherein the outer detection unit comprises a pair of edge sensors that are arranged side by side along the width direction,
   the inner detection unit comprises a pair of edge sensors that are arranged side by side along the width direction, and
   the control unit executes the deceleration control function when both of the pair of edge sensors of the outer detection unit detect the edge of the plane, and
   the control unit causes the moving means to stop the movement when both of the pair of edge sensors of the inner detection unit detect the edge of the plane.

8. The self-propelled robot according to claim 7, wherein under a status where the robot is traveling parallel to the edge of the plane, and when the outer detection unit and the inner detection unit both detect that the plane exists beneath these detection units, the control unit changes the traveling direction in order to approach the edge of the plane, when defining that the pair of the edge sensors of the outer detection unit are inner edge sensor and outer edge sensor in accordance with their positions with respect to the width direction, and the inner edge sensor does detect and the outer edge sensor does not detect that the plane exists beneath these sensors, the control unit changes the traveling direction in order to part away from the edge of the plane.

9. A self-propelled robot that autonomously travels on a structure having a plane and performs a work on the plane of the structure, the robot comprising:

a robot main body;

a moving means that is provided with the robot main body and is configured to autonomously travels such that the robot moves in a traveling direction;

a working unit that performs the work on the plane;

a control unit that controls movements of the robot main body including the moving means and the working unit;

an edge detection unit that detects an edge of the plane, being connected to the control unit;

a danger detection unit that
is configured to detect whether or not the plane exists beneath the danger detection unit, and
is disposed between the inner detection unit and the moving means in the traveling direction; and a danger avoidance control unit that is connected to the moving means and the danger detection unit, wherein the edge detection unit is configured with at least two detection units that are an outer detection unit that is located at a leading side of the moving means in the traveling direction and an inner detection unit that is located at the leading side of the moving means and at a trailing side of the outer detection unit in the traveling direction such that the inner detection unit intervenes between the moving means and the outer detection unit in the traveling direction, and when detecting that the plane does not exist beneath the danger detection unit, the danger detection unit sends a signal to the danger avoidance control unit, and the danger avoidance control unit stops the movement of the moving means based on the signal so that the robot does not move forward after the signal is generated.

10. A self-propelled robot that autonomously travels on a structure having a plane and performs a work on the plane of the structure, the robot comprising:

a robot main body;

a moving means that is provided with the robot main body and is configured to autonomously travels such that the robot moves in a traveling direction;

a working unit that performs the work on the plane, a control unit that controls movements of the robot main body including the moving means and the working unit; and an edge detection unit that detects an edge of the plane, being connected to the control unit, wherein the edge detection unit is configured with at least two detection units that are an outer detection unit that is located at a leading side of the moving means in the traveling direction, and an inner detection unit that is located at the leading side of the moving means and at a trailing side of the outer detection unit in the traveling direction such that the inner detection unit intervenes between the moving means and the outer detection unit in the traveling direction, the control unit further has a deceleration control function by which the control unit decrease a traveling speed of the robot, when the outer detection unit detects the edge of the plane, the control unit executes the deceleration control function, causing the moving means to decrease the traveling speed of the robot, and when the inner detection unit detects the edge of the plane after the outer detection unit detects the edge of the plane, the control unit causes the moving means to stop the movement.

* * * * *